United States Patent
Sundar et al.

(10) Patent No.: US 11,050,554 B2
(45) Date of Patent: Jun. 29, 2021

(54) TECHNOLOGIES FOR MANAGING EXACT MATCH HASH TABLE GROWTH

(71) Applicant: Intel Corporation, Santa Clara, CA (US)

(72) Inventors: Naru Sundar, Los Gatos, CA (US); Chih-Jen Chang, Union City, CA (US); Robert Southworth, Chatsworth, CA (US); Hsi-Cheng Chu, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 607 days.

(21) Appl. No.: 15/859,387

(22) Filed: Dec. 30, 2017

(65) Prior Publication Data

US 2019/0044859 A1    Feb. 7, 2019

Related U.S. Application Data

(60) Provisional application No. 62/584,401, filed on Nov. 10, 2017.

(30) Foreign Application Priority Data

Aug. 30, 2017    (IN) .............................. 201741030632

(51) Int. Cl.
*H04L 9/08*    (2006.01)
*G06F 3/06*    (2006.01)
(Continued)

(52) U.S. Cl.
CPC .......... *H04L 9/0819* (2013.01); *G06F 3/0604* (2013.01); *G06F 3/065* (2013.01); *G06F 3/0605* (2013.01); *G06F 3/067* (2013.01); *G06F 3/0611* (2013.01); *G06F 3/0613* (2013.01); *G06F 3/0629* (2013.01); *G06F 3/0631* (2013.01); *G06F 3/0632* (2013.01); *G06F 3/0644* (2013.01); *G06F 3/0647* (2013.01); *G06F 3/0659* (2013.01); *G06F 3/0673* (2013.01); *G06F 3/0683* (2013.01); *G06F 3/0685* (2013.01); *G06F 9/28* (2013.01);

(Continued)

(58) Field of Classification Search
None
See application file for complete search history.

(56) References Cited

U.S. PATENT DOCUMENTS

| 5,123,045 | A | * | 6/1992 | Ostrovsky | ........... | G06F 12/1408 |
| | | | | | | 380/46 |
| 7,500,073 | B1 | * | 3/2009 | Cholleti | ................. | G06F 9/526 |
| | | | | | | 711/163 |

(Continued)

*Primary Examiner* — Nicholas Sloms
(74) *Attorney, Agent, or Firm* — Compass IP Law PC

(57) ABSTRACT

Technologies for managing exact match hash table growth include a network computing device which includes a compute engine and a network interface controller (NIC). The NIC is configured to allocate a plurality of physical bucket addresses in non-contiguous chunks of memory of the compute engine, configure a bucket threshold value as a function of a hash size of the hash table, generate a plurality of virtual bucket addresses as a function of the bucket threshold value, and map each generated virtual bucket address to an allocated physical bucket address. Other embodiments are described herein.

18 Claims, 21 Drawing Sheets

(51) Int. Cl.

| | |
|---|---|
| G06F 9/50 | (2006.01) |
| H04L 29/06 | (2006.01) |
| H04L 29/08 | (2006.01) |
| G06F 16/25 | (2019.01) |
| G06F 16/2453 | (2019.01) |
| H04L 12/861 | (2013.01) |
| G11C 8/12 | (2006.01) |
| G11C 29/02 | (2006.01) |
| H04L 12/24 | (2006.01) |
| G06F 30/34 | (2020.01) |
| G11C 29/36 | (2006.01) |
| G11C 29/38 | (2006.01) |
| G11C 29/44 | (2006.01) |
| G06F 16/22 | (2019.01) |
| G06F 16/2455 | (2019.01) |
| G06F 12/02 | (2006.01) |
| G06F 12/14 | (2006.01) |
| G06F 13/16 | (2006.01) |
| G06F 15/173 | (2006.01) |
| G06F 13/40 | (2006.01) |
| G06F 13/42 | (2006.01) |
| G06F 9/448 | (2018.01) |
| G06F 9/28 | (2006.01) |
| G06F 15/16 | (2006.01) |
| H04L 12/703 | (2013.01) |
| H04L 12/743 | (2013.01) |
| H04L 12/801 | (2013.01) |
| H04L 12/803 | (2013.01) |
| H04L 12/935 | (2013.01) |
| H04L 12/931 | (2013.01) |
| G06F 9/4401 | (2018.01) |
| G06F 9/445 | (2018.01) |
| G06F 12/06 | (2006.01) |
| G06F 16/23 | (2019.01) |
| G06F 16/248 | (2019.01) |
| G06F 16/901 | (2019.01) |
| G06F 16/11 | (2019.01) |
| G06F 12/0802 | (2016.01) |
| G06F 12/1045 | (2016.01) |

(52) U.S. Cl.
CPC ............ *G06F 9/445* (2013.01); *G06F 9/4406* (2013.01); *G06F 9/4411* (2013.01); *G06F 9/4494* (2018.02); *G06F 9/5044* (2013.01); *G06F 9/5088* (2013.01); *G06F 12/023* (2013.01); *G06F 12/06* (2013.01); *G06F 12/0607* (2013.01); *G06F 12/14* (2013.01); *G06F 13/1663* (2013.01); *G06F 13/1668* (2013.01); *G06F 13/4068* (2013.01); *G06F 13/42* (2013.01); *G06F 15/161* (2013.01); *G06F 15/17331* (2013.01); *G06F 16/119* (2019.01); *G06F 16/221* (2019.01); *G06F 16/2237* (2019.01); *G06F 16/2255* (2019.01); *G06F 16/2282* (2019.01); *G06F 16/2365* (2019.01); *G06F 16/248* (2019.01); *G06F 16/2453* (2019.01); *G06F 16/2455* (2019.01); *G06F 16/24553* (2019.01); *G06F 16/25* (2019.01); *G06F 16/9014* (2019.01); *G06F 30/34* (2020.01); *G11C 8/12* (2013.01); *G11C 29/028* (2013.01); *G11C 29/36* (2013.01); *G11C 29/38* (2013.01); *G11C 29/44* (2013.01); *H04L 9/0894* (2013.01); *H04L 41/0213* (2013.01); *H04L 41/0668* (2013.01); *H04L 41/0677* (2013.01); *H04L 41/0893* (2013.01); *H04L 41/0896* (2013.01); *H04L 45/28* (2013.01); *H04L 45/7453* (2013.01); *H04L 47/11* (2013.01); *H04L 47/125* (2013.01); *H04L 49/30* (2013.01); *H04L 49/351* (2013.01); *H04L 49/9005* (2013.01); *H04L 67/1002* (2013.01); *H04L 69/12* (2013.01); *H04L 69/22* (2013.01); *H04L 69/32* (2013.01); *H04L 69/321* (2013.01); *G06F 9/4401* (2013.01); *G06F 12/0802* (2013.01); *G06F 12/1054* (2013.01); *G06F 12/1063* (2013.01); *G06F 2201/85* (2013.01); *G06F 2209/509* (2013.01); *G06F 2212/1044* (2013.01); *G06F 2212/1052* (2013.01); *G06F 2212/601* (2013.01); *G06F 2213/0064* (2013.01)

(56) References Cited

U.S. PATENT DOCUMENTS

| | | | |
|---|---|---|---|
| 8,464,024 B2 * | 6/2013 | Makphaibulchoke | G06F 12/1018 711/216 |
| 10,049,078 B1 * | 8/2018 | Volpe | G06F 15/167 |
| 2006/0116989 A1 * | 6/2006 | Bellamkonda | G06F 16/24556 |
| 2006/0221977 A1 * | 10/2006 | Basso | H04L 45/745 370/392 |
| 2010/0114915 A1 * | 5/2010 | Gorton, Jr. | G06F 11/3476 707/752 |
| 2012/0222005 A1 * | 8/2012 | Harris | G06F 3/0673 717/120 |
| 2012/0323970 A1 * | 12/2012 | Larson | G06F 16/9014 707/800 |
| 2014/0244598 A1 * | 8/2014 | Haustein | H04L 63/123 707/692 |
| 2015/0207815 A1 * | 7/2015 | Cai | H04L 63/1425 726/22 |
| 2017/0068700 A1 * | 3/2017 | Sapa | G06F 16/2365 |
| 2017/0255709 A1 * | 9/2017 | Cho | G06F 16/9024 |
| 2018/0341596 A1 * | 11/2018 | Teotia | G06F 16/9014 |
| 2018/0349374 A1 * | 12/2018 | Gurajada | G06F 3/0653 |

* cited by examiner

TECHNOLOGIES FOR MANAGING EXACT MATCH HASH TABLE GROWTH

CROSS-REFERENCE TO RELATED APPLICATIONS

The present application claims the benefit of Indian Provisional Patent Application No. 201741030632, filed Aug. 30, 2017 and U.S. Provisional Patent Application No. 62/584,401, filed Nov. 10, 2017.

BACKGROUND

Hash-bucket based lookup tables are common in hardware as an efficient solution for providing high-scale exact match functionality. Typically, a hash is computed on a lookup key to identify a "bucket" consisting of multiple "entries." If all entries in the bucket are full, usually an entry error is used or a secondary table (e.g., a TCAM at smaller scale) is used to store such collision cases. As such, the exact match hash table is very hardware friendly given that all steps are deterministic, fixed cycle-length options.

However, changes in the hash configuration, such as the number of bits of hash value used to pick a bucket, can result in changing the bucket association of a given key. Generally, such changes result from trying to grow the capacity of a logical table. One such solution is to delete and reinsert all hash table entries. While this may be an acceptable approach under certain conditions (e.g., for small tables), such an approach can be time consuming and cause service outages for high-scale hash tables, which is likely to be unacceptable for network traffic processing devices.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
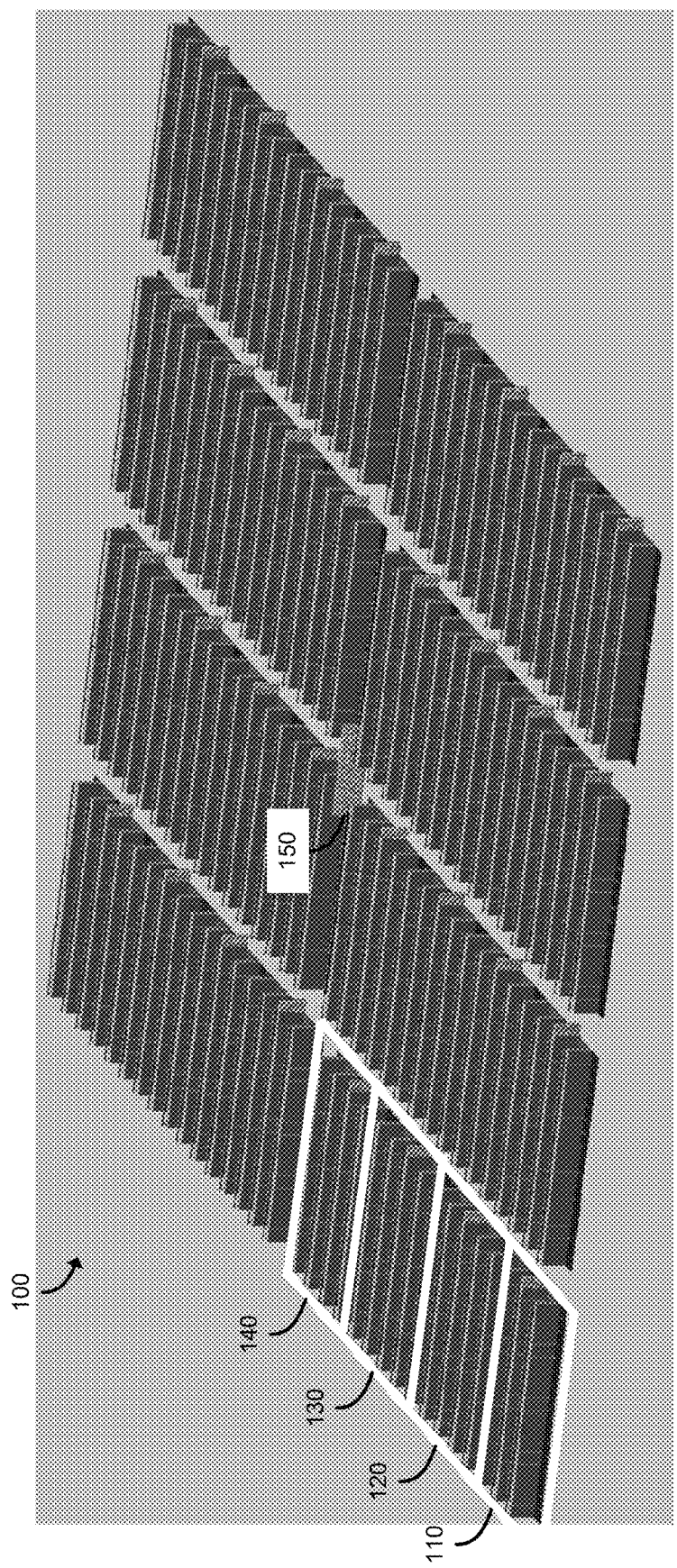
FIG. 1 is a simplified diagram of at least one embodiment of a data center for executing workloads with disaggregated resources.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C).

Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a data center 100 in which disaggregated resources may cooperatively execute one or more workloads (e.g., applications on behalf of customers) includes multiple pods 110, 120, 130, 140, each of which includes one or more rows of racks. As described in more detail herein, each rack houses multiple sleds, which each may be embodied as a compute device, such as a server, that is primarily equipped with a particular type of resource (e.g., memory devices, data storage devices, accelerator devices, general purpose processors). In the illustrative embodiment, the sleds in each pod 110, 120, 130, 140 are connected to multiple pod switches (e.g., switches that route data communications to and from sleds within the pod). The pod switches, in turn, connect with spine switches 150 that switch communications among pods (e.g., the pods 110, 120, 130, 140) in the data center 100. In some embodiments, the sleds may be connected with a fabric using Intel Omni-Path technology. As described in more detail herein, resources within sleds in the data center 100 may be allocated to a group (referred to herein as a "managed node") containing resources from one or more other sleds to be collectively utilized in the execution of a workload. The workload can execute as if the resources belonging to the managed node were located on the same sled. The resources in a managed node may even belong to sleds belonging to different racks, and even to different pods 110, 120, 130, 140. Some resources of a single sled may be allocated to one managed node while other resources of the same sled are allocated to a different managed node (e.g., one processor assigned to one managed node and another processor of the same sled assigned to a different managed node). By disaggregating resources to sleds comprised predominantly of a single type of resource (e.g., compute sleds comprising primarily compute resources, memory sleds containing primarily memory resources), and selectively allocating and deallocating the disaggregated resources to form a managed node assigned to execute a workload, the data center 100 provides more efficient resource usage over typical data centers comprised of hyperconverged servers containing compute, memory, storage and perhaps additional resources). As such, the data center 100 may provide greater performance (e.g., throughput, operations per second, latency, etc.) than a typical data center that has the same number of resources.

Figure 2:
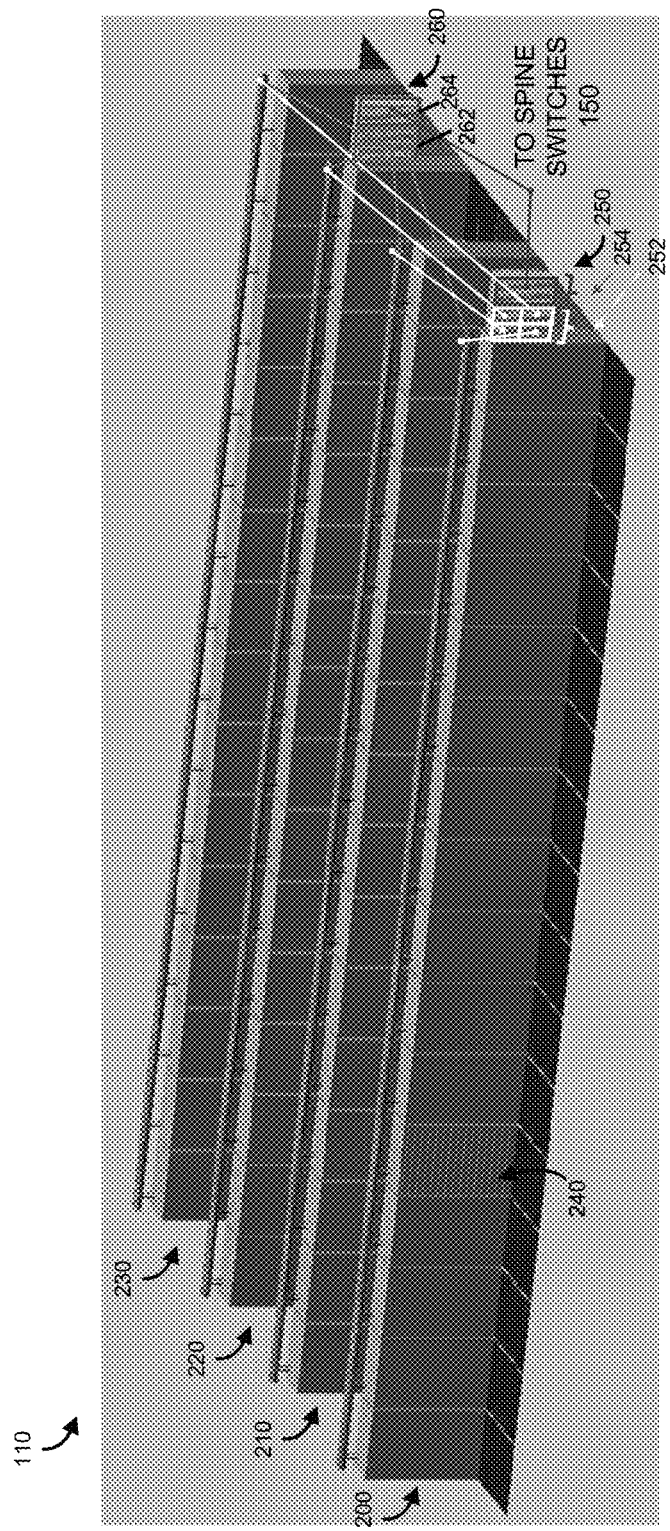
FIG. 2 is a simplified diagram of at least one embodiment of a pod of the data center of FIG. 1.

Referring now to FIG. 2, the pod 110, in the illustrative embodiment, includes a set of rows 200, 210, 220, 230 of racks 240. Each rack 240 may house multiple sleds (e.g., sixteen sleds) and provide power and data connections to the housed sleds, as described in more detail herein. In the illustrative embodiment, the racks in each row 200, 210, 220, 230 are connected to multiple pod switches 250, 260. The pod switch 250 includes a set of ports 252 to which the sleds of the racks of the pod 110 are connected and another set of ports 254 that connect the pod 110 to the spine switches 150 to provide connectivity to other pods in the data center 100. Similarly, the pod switch 260 includes a set of ports 262 to which the sleds of the racks of the pod 110 are connected and a set of ports 264 that connect the pod 110 to the spine switches 150. As such, the use of the pair of switches 250, 260 provides an amount of redundancy to the pod 110. For example, if either of the switches 250, 260 fails, the sleds in the pod 110 may still maintain data communication with the remainder of the data center 100 (e.g., sleds of other pods) through the other switch 250, 260. Furthermore, in the illustrative embodiment, the switches 150, 250, 260 may be embodied as dual-mode optical switches, capable of routing both Ethernet protocol communications carrying Internet Protocol (IP) packets and communications according to a second, high-performance link-layer protocol (e.g., Intel's Omni-Path Architecture's, Infiniband) via optical signaling media of an optical fabric.

It should be appreciated that each of the other pods 120, 130, 140 (as well as any additional pods of the data center 100) may be similarly structured as, and have components similar to, the pod 110 shown in and described in regard to FIG. 2 (e.g., each pod may have rows of racks housing multiple sleds as described above). Additionally, while two pod switches 250, 260 are shown, it should be understood that in other embodiments, each pod 110, 120, 130, 140 may be connected to different number of pod switches (e.g., providing even more failover capacity).

Figure 3:
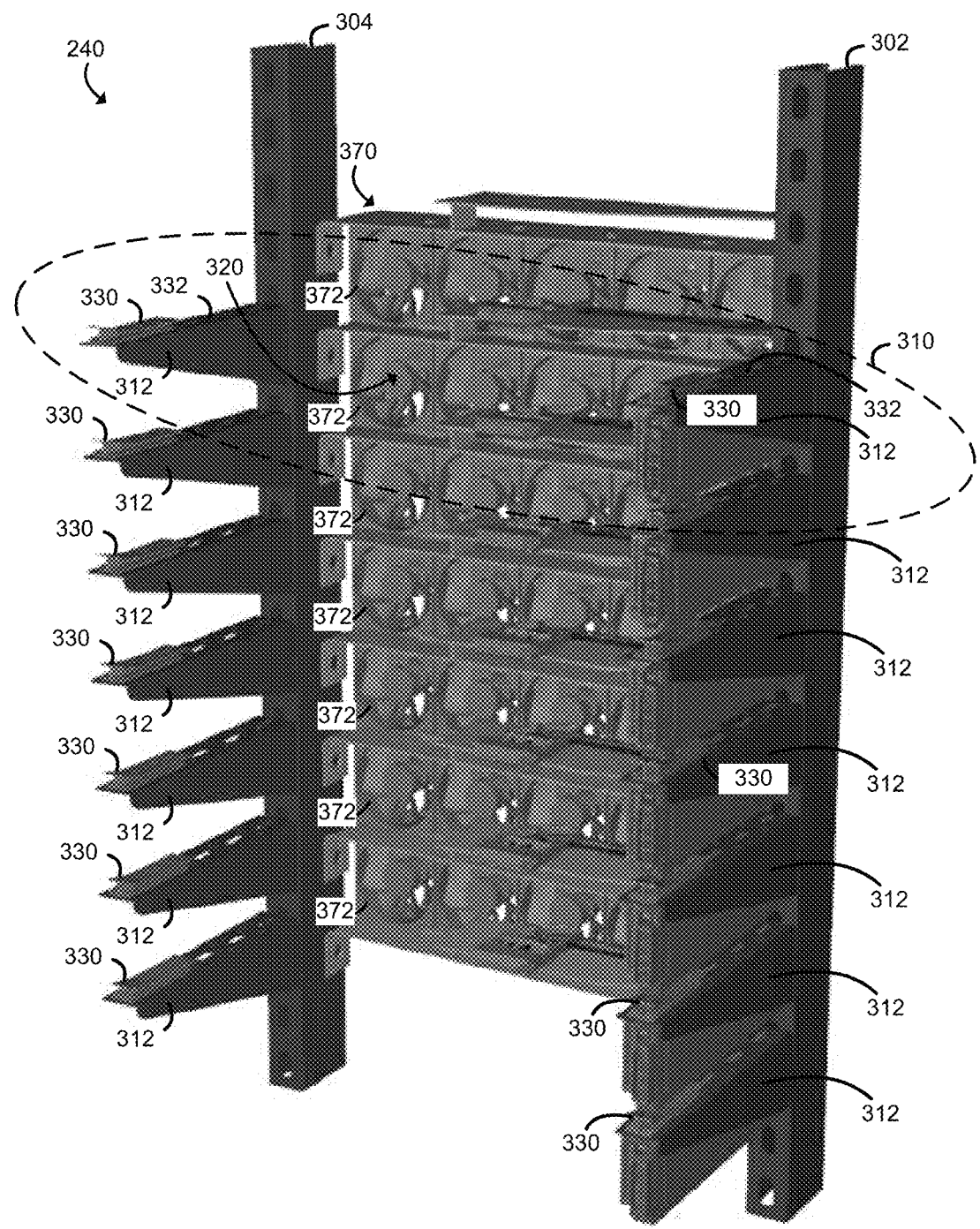
FIG. 3 is a perspective view of at least one embodiment of a rack that may be included in the pod of FIG. 2.
Figure 4:
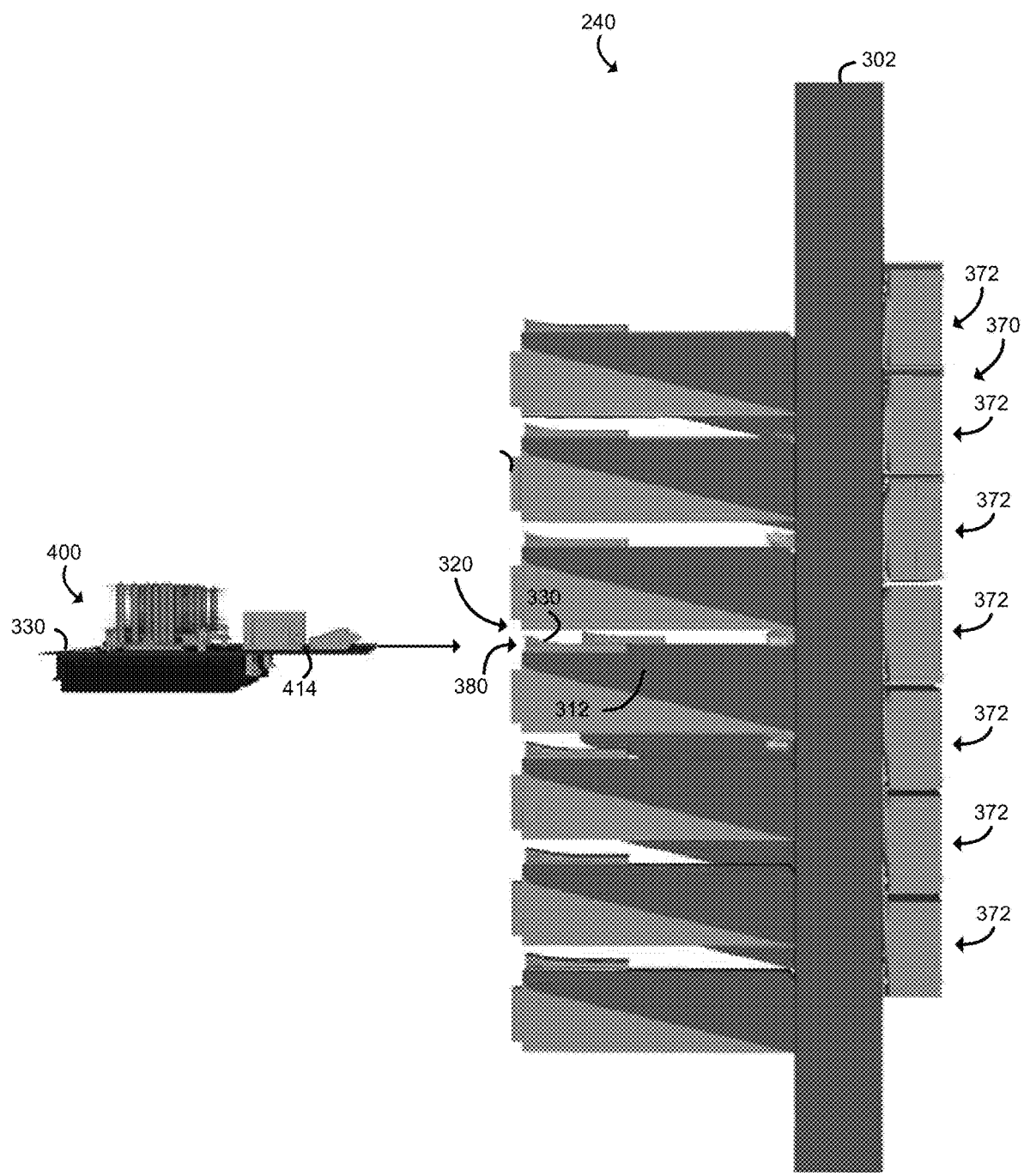
FIG. 4 is a side plan elevation view of the rack of FIG. 3.
Figure 5:
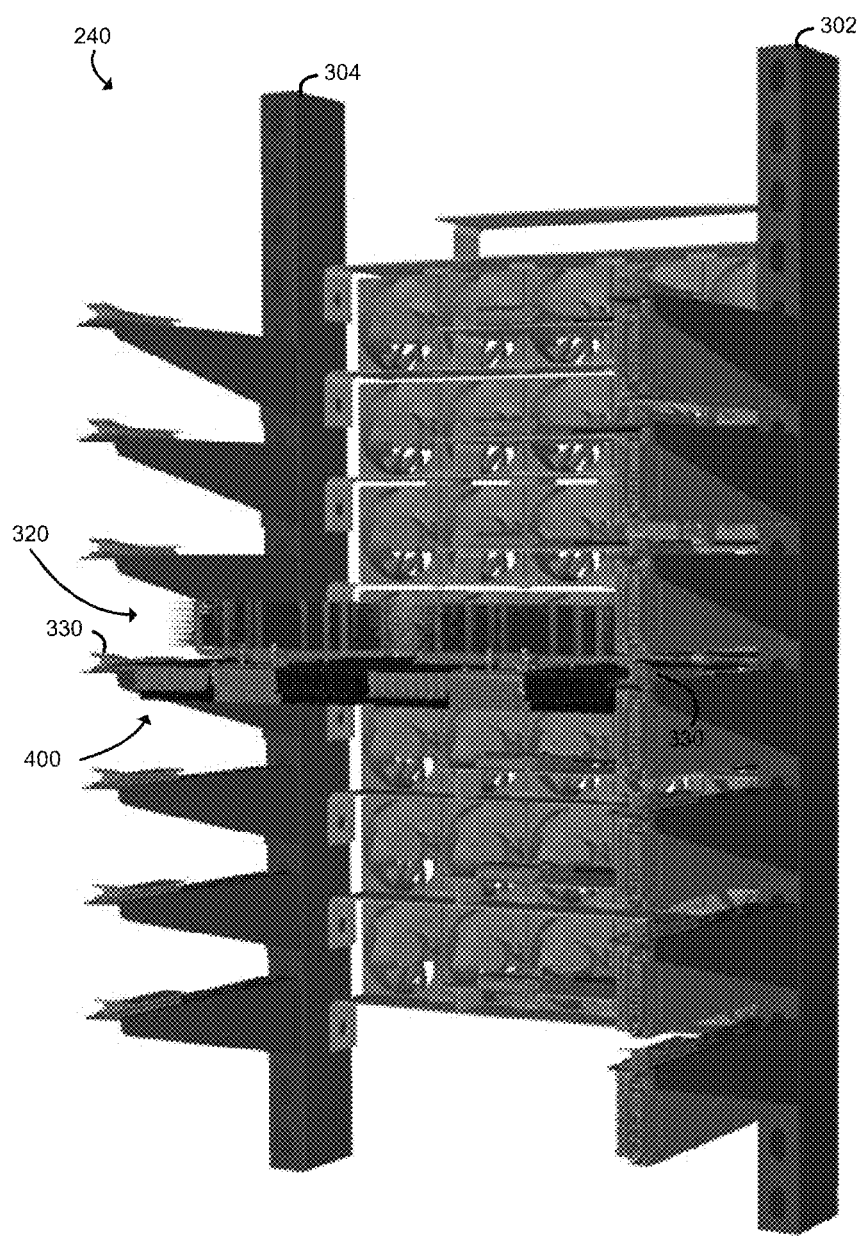
FIG. 5 is a perspective view of the rack of FIG. 3 having a sled mounted therein.

Referring now to FIGS. 3-5, each illustrative rack 240 of the data center 100 includes two elongated support posts 302, 304, which are arranged vertically. For example, the elongated support posts 302, 304 may extend upwardly from a floor of the data center 100 when deployed. The rack 240 also includes one or more horizontal pairs 310 of elongated support arms 312 (identified in FIG. 3 via a dashed ellipse) configured to support a sled of the data center 100 as discussed below. One elongated support arm 312 of the pair of elongated support arms 312 extends outwardly from the elongated support post 302 and the other elongated support arm 312 extends outwardly from the elongated support post 304.

In the illustrative embodiments, each sled of the data center 100 is embodied as a chassis-less sled. That is, each sled has a chassis-less circuit board substrate on which physical resources (e.g., processors, memory, accelerators, storage, etc.) are mounted as discussed in more detail below. As such, the rack 240 is configured to receive the chassis-less sleds. For example, each pair 310 of elongated support arms 312 defines a sled slot 320 of the rack 240, which is configured to receive a corresponding chassis-less sled. To do so, each illustrative elongated support arm 312 includes a circuit board guide 330 configured to receive the chassis-less circuit board substrate of the sled. Each circuit board guide 330 is secured to, or otherwise mounted to, a top side 332 of the corresponding elongated support arm 312. For example, in the illustrative embodiment, each circuit board guide 330 is mounted at a distal end of the corresponding elongated support arm 312 relative to the corresponding elongated support post 302, 304. For clarity of the Figures, not every circuit board guide 330 may be referenced in each Figure.

Each circuit board guide 330 includes an inner wall that defines a circuit board slot 380 configured to receive the chassis-less circuit board substrate of a sled 400 when the sled 400 is received in the corresponding sled slot 320 of the rack 240. To do so, as shown in FIG. 4, a user (or robot) aligns the chassis-less circuit board substrate of an illustrative chassis-less sled 400 to a sled slot 320. The user, or robot, may then slide the chassis-less circuit board substrate forward into the sled slot 320 such that each side edge 414 of the chassis-less circuit board substrate is received in a corresponding circuit board slot 380 of the circuit board guides 330 of the pair 310 of elongated support arms 312 that define the corresponding sled slot 320 as shown in FIG. 4. By having robotically accessible and robotically manipulable sleds comprising disaggregated resources, each type of resource can be upgraded independently of each other and at their own optimized refresh rate. Furthermore, the sleds are configured to blindly mate with power and data communication cables in each rack 240, enhancing their ability to be quickly removed, upgraded, reinstalled, and/or replaced. As such, in some embodiments, the data center 100 may operate (e.g., execute workloads, undergo maintenance and/or upgrades, etc.) without human involvement on the data center floor. In other embodiments, a human may facilitate one or more maintenance or upgrade operations in the data center 100.

It should be appreciated that each circuit board guide 330 is dual sided. That is, each circuit board guide 330 includes an inner wall that defines a circuit board slot 380 on each side of the circuit board guide 330. In this way, each circuit board guide 330 can support a chassis-less circuit board substrate on either side. As such, a single additional elongated support post may be added to the rack 240 to turn the rack 240 into a two-rack solution that can hold twice as many sled slots 320 as shown in FIG. 3. The illustrative rack 240 includes seven pairs 310 of elongated support arms 312 that define a corresponding seven sled slots 320, each configured to receive and support a corresponding sled 400 as discussed above. Of course, in other embodiments, the rack 240 may include additional or fewer pairs 310 of elongated support arms 312 (i.e., additional or fewer sled slots 320). It should be appreciated that because the sled 400 is chassis-less, the sled 400 may have an overall height that is different than typical servers. As such, in some embodiments, the height of each sled slot 320 may be shorter than the height of a typical server (e.g., shorter than a single rank unit, "1U"). That is, the vertical distance between each pair 310 of elongated support arms 312 may be less than a standard rack unit "1U." Additionally, due to the relative decrease in height of the sled slots 320, the overall height of the rack 240 in some embodiments may be shorter than the height of traditional rack enclosures. For example, in some embodiments, each of the elongated support posts 302, 304 may have a length of six feet or less. Again, in other embodiments, the rack 240 may have different dimensions. Further, it should be appreciated that the rack 240 does not include any walls, enclosures, or the like. Rather, the rack 240 is an enclosure-less rack that is opened to the local environment. Of course, in some cases, an end plate may be attached to one of the elongated support posts 302, 304 in those situations in which the rack 240 forms an end-of-row rack in the data center 100.

In some embodiments, various interconnects may be routed upwardly or downwardly through the elongated support posts 302, 304. To facilitate such routing, each elongated support post 302, 304 includes an inner wall that defines an inner chamber in which the interconnect may be located. The interconnects routed through the elongated support posts 302, 304 may be embodied as any type of interconnects including, but not limited to, data or communication interconnects to provide communication connections to each sled slot 320, power interconnects to provide power to each sled slot 320, and/or other types of interconnects.

The rack 240, in the illustrative embodiment, includes a support platform on which a corresponding optical data connector (not shown) is mounted. Each optical data connector is associated with a corresponding sled slot 320 and is configured to mate with an optical data connector of a corresponding sled 400 when the sled 400 is received in the corresponding sled slot 320. In some embodiments, optical connections between components (e.g., sleds, racks, and switches) in the data center 100 are made with a blind mate optical connection. For example, a door on each cable may prevent dust from contaminating the fiber inside the cable. In the process of connecting to a blind mate optical connector mechanism, the door is pushed open when the end of the cable enters the connector mechanism. Subsequently, the optical fiber inside the cable enters a gel within the connector mechanism and the optical fiber of one cable comes into contact with the optical fiber of another cable within the gel inside the connector mechanism.

The illustrative rack 240 also includes a fan array 370 coupled to the cross-support arms of the rack 240. The fan array 370 includes one or more rows of cooling fans 372, which are aligned in a horizontal line between the elongated support posts 302, 304. In the illustrative embodiment, the fan array 370 includes a row of cooling fans 372 for each sled slot 320 of the rack 240. As discussed above, each sled 400 does not include any on-board cooling system in the illustrative embodiment and, as such, the fan array 370 provides cooling for each sled 400 received in the rack 240. Each rack 240, in the illustrative embodiment, also includes a power supply associated with each sled slot 320. Each power supply is secured to one of the elongated support arms 312 of the pair 310 of elongated support arms 312 that define the corresponding sled slot 320. For example, the rack 240 may include a power supply coupled or secured to each elongated support arm 312 extending from the elongated support post 302. Each power supply includes a power connector configured to mate with a power connector of the sled 400 when the sled 400 is received in the corresponding sled slot 320. In the illustrative embodiment, the sled 400 does not include any on-board power supply and, as such, the power supplies provided in the rack 240 supply power to corresponding sleds 400 when mounted to the rack 240.

Figure 6:
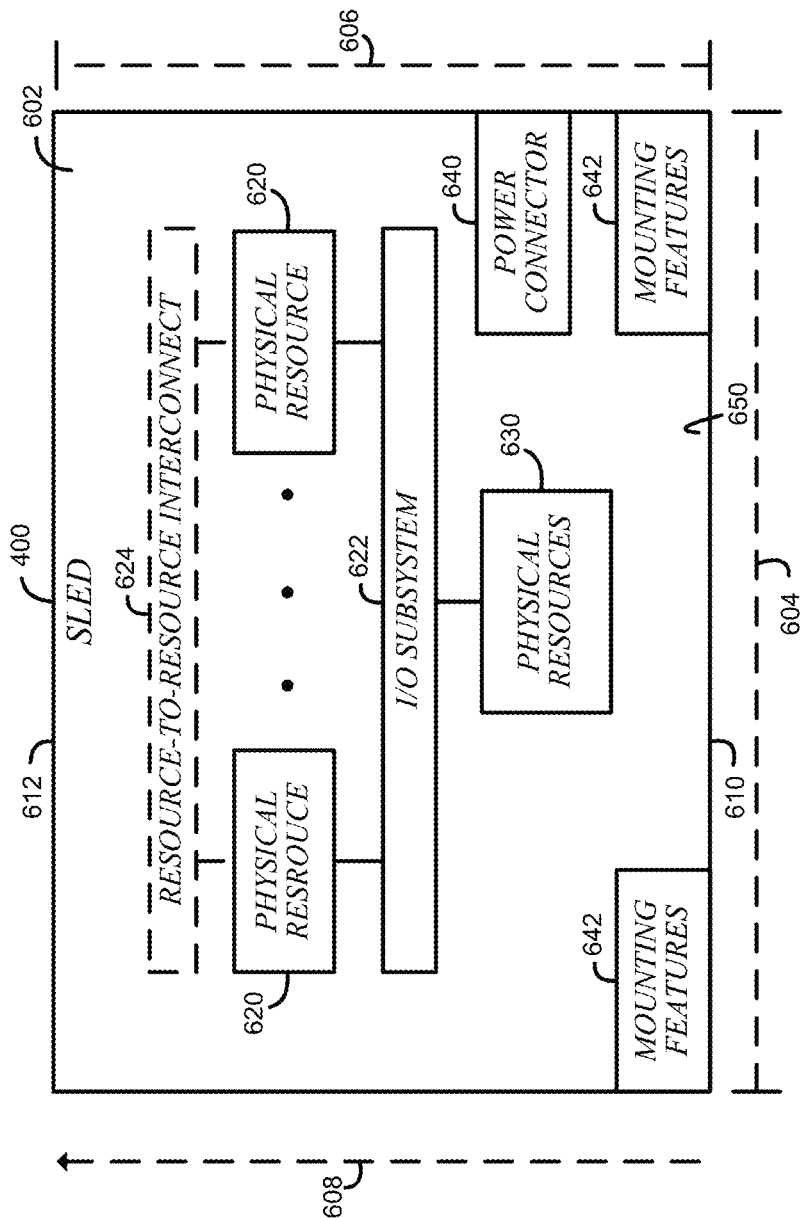
FIG. 6 is a is a simplified block diagram of at least one embodiment of a top side of the sled of FIG. 5.

Referring now to FIG. 6, the sled 400, in the illustrative embodiment, is configured to be mounted in a corresponding rack 240 of the data center 100 as discussed above. In some embodiments, each sled 400 may be optimized or otherwise configured for performing particular tasks, such as compute tasks, acceleration tasks, data storage tasks, etc. For example, the sled 400 may be embodied as a compute sled 800 as discussed below in regard to FIGS. 8-9, an accelerator sled 1000 as discussed below in regard to FIGS. 10-11, a storage sled 1200 as discussed below in regard to FIGS.

12-13, or as a sled optimized or otherwise configured to perform other specialized tasks, such as a memory sled 1400, discussed below in regard to FIG. 14.

As discussed above, the illustrative sled 400 includes a chassis-less circuit board substrate 602, which supports various physical resources (e.g., electrical components) mounted thereon. It should be appreciated that the circuit board substrate 602 is "chassis-less" in that the sled 400 does not include a housing or enclosure. Rather, the chassis-less circuit board substrate 602 is open to the local environment. The chassis-less circuit board substrate 602 may be formed from any material capable of supporting the various electrical components mounted thereon. For example, in an illustrative embodiment, the chassis-less circuit board substrate 602 is formed from an FR-4 glass-reinforced epoxy laminate material. Of course, other materials may be used to form the chassis-less circuit board substrate 602 in other embodiments.

As discussed in more detail below, the chassis-less circuit board substrate 602 includes multiple features that improve the thermal cooling characteristics of the various electrical components mounted on the chassis-less circuit board substrate 602. As discussed, the chassis-less circuit board substrate 602 does not include a housing or enclosure, which may improve the airflow over the electrical components of the sled 400 by reducing those structures that may inhibit air flow. For example, because the chassis-less circuit board substrate 602 is not positioned in an individual housing or enclosure, there is no backplane (e.g., a backplate of the chassis) to the chassis-less circuit board substrate 602, which could inhibit air flow across the electrical components. Additionally, the chassis-less circuit board substrate 602 has a geometric shape configured to reduce the length of the airflow path across the electrical components mounted to the chassis-less circuit board substrate 602. For example, the illustrative chassis-less circuit board substrate 602 has a width 604 that is greater than a depth 606 of the chassis-less circuit board substrate 602. In one particular embodiment, for example, the chassis-less circuit board substrate 602 has a width of about 21 inches and a depth of about 9 inches, compared to a typical server that has a width of about 17 inches and a depth of about 39 inches. As such, an airflow path 608 that extends from a front edge 610 of the chassis-less circuit board substrate 602 toward a rear edge 612 has a shorter distance relative to typical servers, which may improve the thermal cooling characteristics of the sled 400. Furthermore, although not illustrated in FIG. 6, the various physical resources mounted to the chassis-less circuit board substrate 602 are mounted in corresponding locations such that no two substantively heat-producing electrical components shadow each other as discussed in more detail below. That is, no two electrical components, which produce appreciable heat during operation (i.e., greater than a nominal heat sufficient enough to adversely impact the cooling of another electrical component), are mounted to the chassis-less circuit board substrate 602 linearly in-line with each other along the direction of the airflow path 608 (i.e., along a direction extending from the front edge 610 toward the rear edge 612 of the chassis-less circuit board substrate 602).

As discussed above, the illustrative sled 400 includes one or more physical resources 620 mounted to a top side 650 of the chassis-less circuit board substrate 602. Although two physical resources 620 are shown in FIG. 6, it should be appreciated that the sled 400 may include one, two, or more physical resources 620 in other embodiments. The physical resources 620 may be embodied as any type of processor, controller, or other compute circuit capable of performing various tasks such as compute functions and/or controlling the functions of the sled 400 depending on, for example, the type or intended functionality of the sled 400. For example, as discussed in more detail below, the physical resources 620 may be embodied as high-performance processors in embodiments in which the sled 400 is embodied as a compute sled, as accelerator co-processors or circuits in embodiments in which the sled 400 is embodied as an accelerator sled, storage controllers in embodiments in which the sled 400 is embodied as a storage sled, or a set of memory devices in embodiments in which the sled 400 is embodied as a memory sled.

The sled 400 also includes one or more additional physical resources 630 mounted to the top side 650 of the chassis-less circuit board substrate 602. In the illustrative embodiment, the additional physical resources include a network interface controller (NIC) as discussed in more detail below. Of course, depending on the type and functionality of the sled 400, the physical resources 630 may include additional or other electrical components, circuits, and/or devices in other embodiments.

The physical resources 620 are communicatively coupled to the physical resources 630 via an input/output (I/O) subsystem 622. The I/O subsystem 622 may be embodied as circuitry and/or components to facilitate input/output operations with the physical resources 620, the physical resources 630, and/or other components of the sled 400. For example, the I/O subsystem 622 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In the illustrative embodiment, the I/O subsystem 622 is embodied as, or otherwise includes, a double data rate 4 (DDR4) data bus or a DDR5 data bus.

In some embodiments, the sled 400 may also include a resource-to-resource interconnect 624. The resource-to-resource interconnect 624 may be embodied as any type of communication interconnect capable of facilitating resource-to-resource communications. In the illustrative embodiment, the resource-to-resource interconnect 624 is embodied as a high-speed point-to-point interconnect (e.g., faster than the I/O subsystem 622). For example, the resource-to-resource interconnect 624 may be embodied as a QuickPath Interconnect (QPI), an UltraPath Interconnect (UPI), or other high-speed point-to-point interconnect dedicated to resource-to-resource communications.

The sled 400 also includes a power connector 640 configured to mate with a corresponding power connector of the rack 240 when the sled 400 is mounted in the corresponding rack 240. The sled 400 receives power from a power supply of the rack 240 via the power connector 640 to supply power to the various electrical components of the sled 400. That is, the sled 400 does not include any local power supply (i.e., an on-board power supply) to provide power to the electrical components of the sled 400. The exclusion of a local or on-board power supply facilitates the reduction in the overall footprint of the chassis-less circuit board substrate 602, which may increase the thermal cooling characteristics of the various electrical components mounted on the chassis-less circuit board substrate 602 as discussed above. In some embodiments, power is provided to the processors 820 through vias directly under the processors 820 (e.g., through the bottom side 750 of the chassis-less circuit board substrate 602), providing an increased thermal budget, additional current and/or voltage, and better voltage control over typical boards.

In some embodiments, the sled 400 may also include mounting features 642 configured to mate with a mounting arm, or other structure, of a robot to facilitate the placement of the sled 600 in a rack 240 by the robot. The mounting features 642 may be embodied as any type of physical structures that allow the robot to grasp the sled 400 without damaging the chassis-less circuit board substrate 602 or the electrical components mounted thereto. For example, in some embodiments, the mounting features 642 may be embodied as non-conductive pads attached to the chassis-less circuit board substrate 602. In other embodiments, the mounting features may be embodied as brackets, braces, or other similar structures attached to the chassis-less circuit board substrate 602. The particular number, shape, size, and/or make-up of the mounting feature 642 may depend on the design of the robot configured to manage the sled 400.

Figure 7:
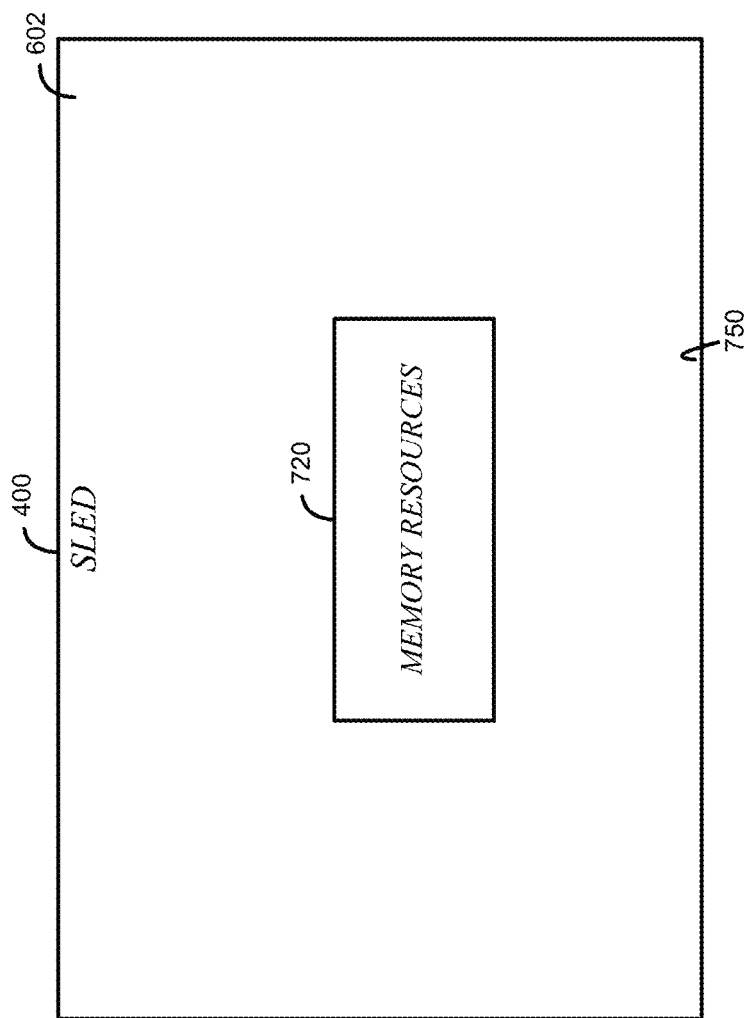
FIG. 7 is a simplified block diagram of at least one embodiment of a bottom side of the sled of FIG. 6.

Referring now to FIG. 7, in addition to the physical resources 630 mounted on the top side 650 of the chassis-less circuit board substrate 602, the sled 400 also includes one or more memory devices 720 mounted to a bottom side 750 of the chassis-less circuit board substrate 602. That is, the chassis-less circuit board substrate 602 is embodied as a double-sided circuit board. The physical resources 620 are communicatively coupled to the memory devices 720 via the I/O subsystem 622. For example, the physical resources 620 and the memory devices 720 may be communicatively coupled by one or more vias extending through the chassis-less circuit board substrate 602. Each physical resource 620 may be communicatively coupled to a different set of one or more memory devices 720 in some embodiments. Alternatively, in other embodiments, each physical resource 620 may be communicatively coupled to each memory devices 720.

The memory devices 720 may be embodied as any type of memory device capable of storing data for the physical resources 620 during operation of the sled 400, such as any type of volatile (e.g., dynamic random access memory (DRAM), etc.) or non-volatile memory. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include next-generation nonvolatile devices, such as Intel 3D XPoint™ memory or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, the memory device may comprise a transistor-less stackable cross point architecture in which memory cells sit at the intersection of word lines and bit lines and are individually addressable and in which bit storage is based on a change in bulk resistance.

Figure 8:
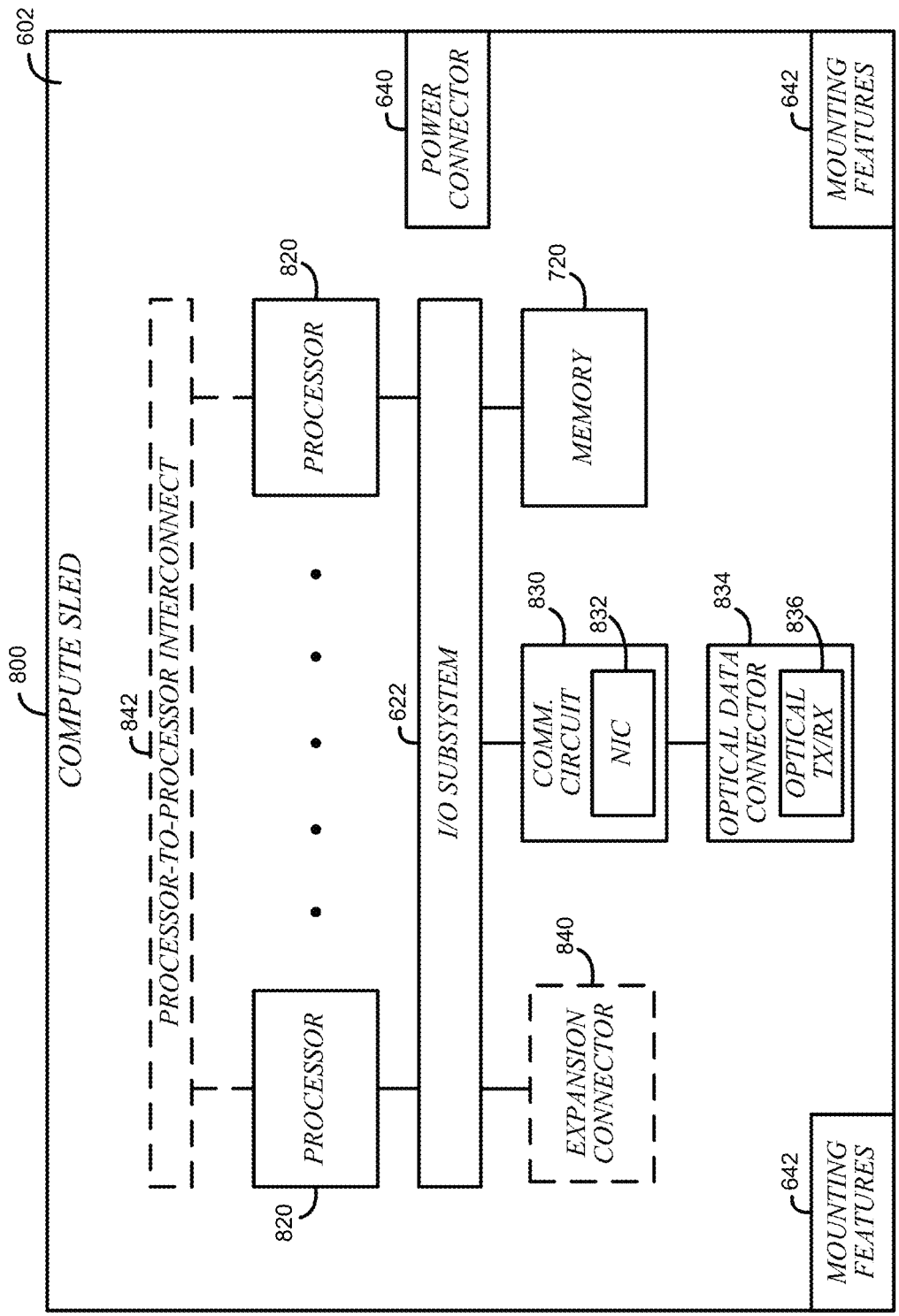
FIG. 8 is a simplified block diagram of at least one embodiment of a compute sled usable in the data center of FIG. 1.

Referring now to FIG. 8, in some embodiments, the sled 400 may be embodied as a compute sled 800. The compute sled 800 is optimized, or otherwise configured, to perform compute tasks. Of course, as discussed above, the compute sled 800 may rely on other sleds, such as acceleration sleds and/or storage sleds, to perform such compute tasks. The compute sled 800 includes various physical resources (e.g., electrical components) similar to the physical resources of the sled 400, which have been identified in FIG. 8 using the same reference numbers. The description of such components provided above in regard to FIGS. 6 and 7 applies to the corresponding components of the compute sled 800 and is not repeated herein for clarity of the description of the compute sled 800.

In the illustrative compute sled 800, the physical resources 620 are embodied as processors 820. Although only two processors 820 are shown in FIG. 8, it should be appreciated that the compute sled 800 may include additional processors 820 in other embodiments. Illustratively, the processors 820 are embodied as high-performance processors 820 and may be configured to operate at a relatively high power rating. Although the processors 820 generate additional heat operating at power ratings greater than typical processors (which operate at around 155-230 W), the enhanced thermal cooling characteristics of the chassis-less circuit board substrate 602 discussed above facilitate the higher power operation. For example, in the illustrative embodiment, the processors 820 are configured to operate at a power rating of at least 250 W. In some embodiments, the processors 820 may be configured to operate at a power rating of at least 350 W.

In some embodiments, the compute sled 800 may also include a processor-to-processor interconnect 842. Similar to the resource-to-resource interconnect 624 of the sled 400 discussed above, the processor-to-processor interconnect 842 may be embodied as any type of communication interconnect capable of facilitating processor-to-processor interconnect 842 communications. In the illustrative embodiment, the processor-to-processor interconnect 842 is embodied as a high-speed point-to-point interconnect (e.g., faster than the I/O subsystem 622). For example, the processor-to-processor interconnect 842 may be embodied as a QuickPath Interconnect (QPI), an UltraPath Interconnect (UPI), or other high-speed point-to-point interconnect dedicated to processor-to-processor communications.

The compute sled 800 also includes a communication circuit 830. The illustrative communication circuit 830 includes a network interface controller (NIC) 832, which may also be referred to as a host fabric interface (HFI). The NIC 832 may be embodied as, or otherwise include, any type of integrated circuit, discrete circuits, controller chips, chipsets, add-in-boards, daughtercards, network interface cards, other devices that may be used by the compute sled 800 to connect with another compute device (e.g., with other sleds 400). In some embodiments, the NIC 832 may be embodied as part of a system-on-a-chip (SoC) that includes one or more processors, or included on a multichip package that also contains one or more processors. In some embodiments, the NIC 832 may include a local processor (not shown) and/or a local memory (not shown) that are both local to the NIC 832. In such embodiments, the local processor of the NIC 832 may be capable of performing one or more of the functions of the processors 820. Additionally or alternatively, in such embodiments, the local memory of the NIC 832 may be integrated into one or more components of the compute sled at the board level, socket level, chip level, and/or other levels.

The communication circuit 830 is communicatively coupled to an optical data connector 834. The optical data connector 834 is configured to mate with a corresponding optical data connector of the rack 240 when the compute sled 800 is mounted in the rack 240. Illustratively, the optical data connector 834 includes a plurality of optical fibers which lead from a mating surface of the optical data connector 834 to an optical transceiver 836. The optical transceiver 836 is configured to convert incoming optical signals from the rack-side optical data connector to electrical signals and to convert electrical signals to outgoing optical signals to the rack-side optical data connector. Although shown as forming part of the optical data connector 834 in the illustrative embodiment, the optical transceiver 836 may form a portion of the communication circuit 830 in other embodiments.

In some embodiments, the compute sled 800 may also include an expansion connector 840. In such embodiments, the expansion connector 840 is configured to mate with a corresponding connector of an expansion chassis-less circuit board substrate to provide additional physical resources to the compute sled 800. The additional physical resources may be used, for example, by the processors 820 during operation of the compute sled 800. The expansion chassis-less circuit board substrate may be substantially similar to the chassis-less circuit board substrate 602 discussed above and may include various electrical components mounted thereto. The particular electrical components mounted to the expansion chassis-less circuit board substrate may depend on the intended functionality of the expansion chassis-less circuit board substrate. For example, the expansion chassis-less circuit board substrate may provide additional compute resources, memory resources, and/or storage resources. As such, the additional physical resources of the expansion chassis-less circuit board substrate may include, but is not limited to, processors, memory devices, storage devices, and/or accelerator circuits including, for example, field programmable gate arrays (FPGA), application-specific integrated circuits (ASICs), security co-processors, graphics processing units (GPUs), machine learning circuits, or other specialized processors, controllers, devices, and/or circuits.

Figure 9:
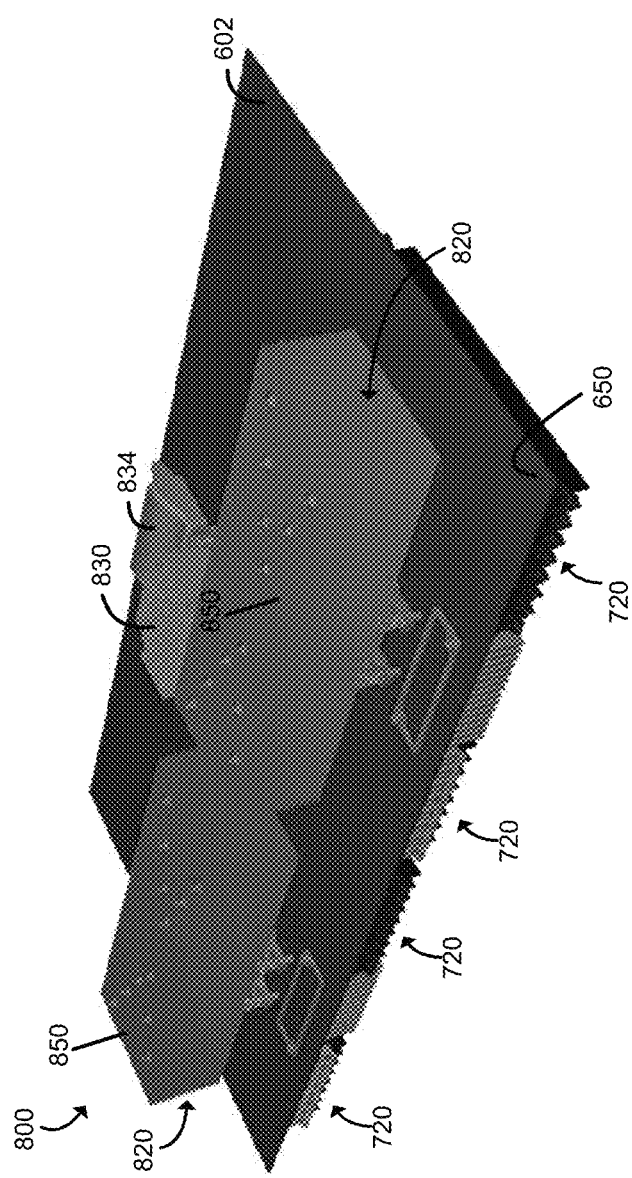
FIG. 9 is a top perspective view of at least one embodiment of the compute sled of FIG. 8.

Referring now to FIG. 9, an illustrative embodiment of the compute sled 800 is shown. As shown, the processors 820, communication circuit 830, and optical data connector 834 are mounted to the top side 650 of the chassis-less circuit board substrate 602. Any suitable attachment or mounting technology may be used to mount the physical resources of the compute sled 800 to the chassis-less circuit board substrate 602. For example, the various physical resources may be mounted in corresponding sockets (e.g., a processor socket), holders, or brackets. In some cases, some of the electrical components may be directly mounted to the chassis-less circuit board substrate 602 via soldering or similar techniques.

As discussed above, the individual processors 820 and communication circuit 830 are mounted to the top side 650 of the chassis-less circuit board substrate 602 such that no two heat-producing, electrical components shadow each other. In the illustrative embodiment, the processors 820 and communication circuit 830 are mounted in corresponding locations on the top side 650 of the chassis-less circuit board substrate 602 such that no two of those physical resources are linearly in-line with others along the direction of the airflow path 608. It should be appreciated that, although the optical data connector 834 is in-line with the communication circuit 830, the optical data connector 834 produces no or nominal heat during operation.

The memory devices 720 of the compute sled 800 are mounted to the bottom side 750 of the of the chassis-less circuit board substrate 602 as discussed above in regard to the sled 400. Although mounted to the bottom side 750, the memory devices 720 are communicatively coupled to the processors 820 located on the top side 650 via the I/O subsystem 622. Because the chassis-less circuit board substrate 602 is embodied as a double-sided circuit board, the memory devices 720 and the processors 820 may be communicatively coupled by one or more vias, connectors, or other mechanisms extending through the chassis-less circuit board substrate 602. Of course, each processor 820 may be communicatively coupled to a different set of one or more memory devices 720 in some embodiments. Alternatively, in other embodiments, each processor 820 may be communicatively coupled to each memory device 720. In some embodiments, the memory devices 720 may be mounted to one or more memory mezzanines on the bottom side of the chassis-less circuit board substrate 602 and may interconnect with a corresponding processor 820 through a ball-grid array.

Each of the processors 820 includes a heatsink 850 secured thereto. Due to the mounting of the memory devices 720 to the bottom side 750 of the chassis-less circuit board substrate 602 (as well as the vertical spacing of the sleds 400 in the corresponding rack 240), the top side 650 of the chassis-less circuit board substrate 602 includes additional "free" area or space that facilitates the use of heatsinks 850 having a larger size relative to traditional heatsinks used in typical servers. Additionally, due to the improved thermal cooling characteristics of the chassis-less circuit board substrate 602, none of the processor heatsinks 850 include cooling fans attached thereto. That is, each of the heatsinks 850 is embodied as a fan-less heatsinks.

Figure 10:
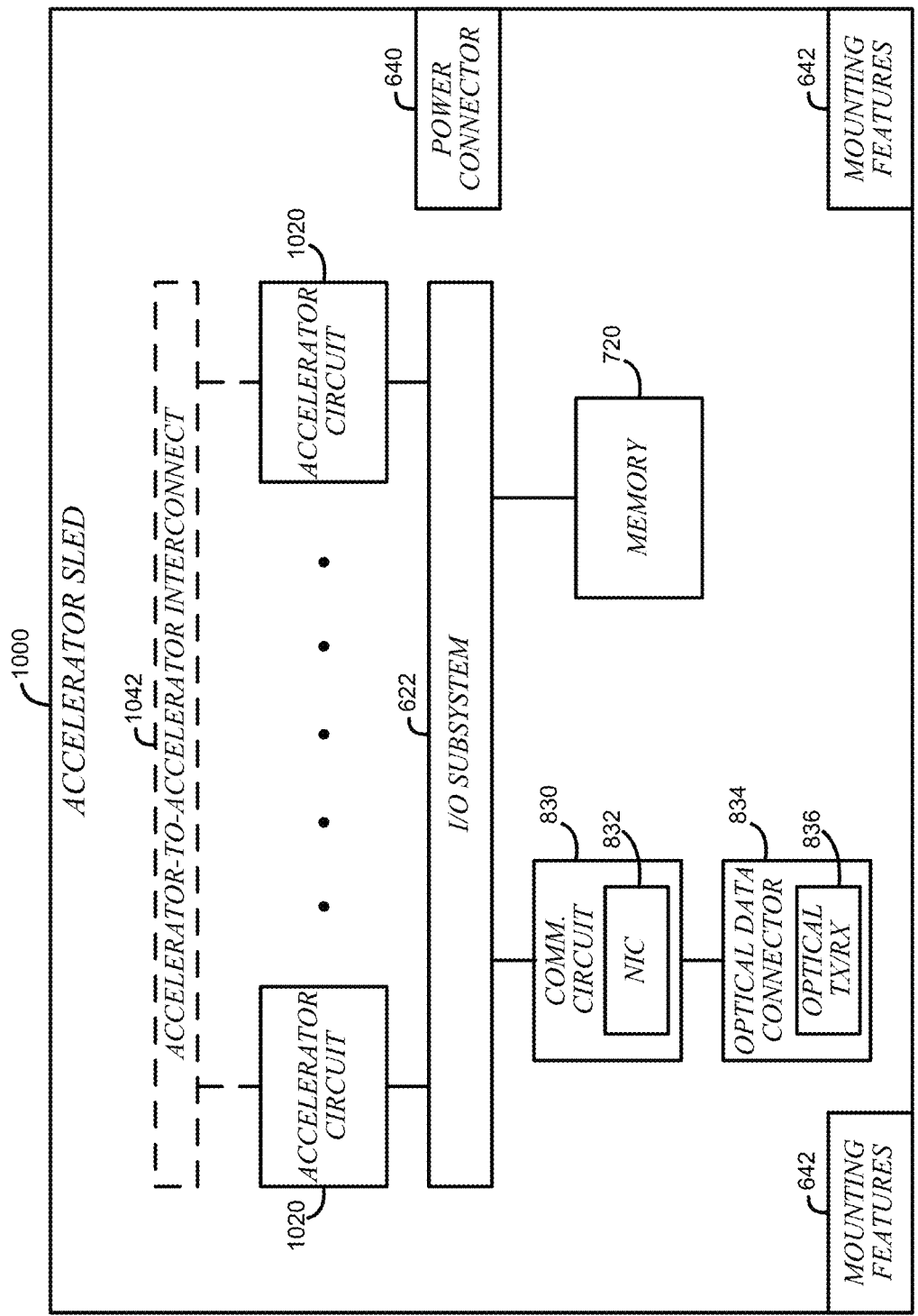
FIG. 10 is a simplified block diagram of at least one embodiment of an accelerator sled usable in the data center of FIG. 1.

Referring now to FIG. 10, in some embodiments, the sled 400 may be embodied as an accelerator sled 1000. The accelerator sled 1000 is optimized, or otherwise configured, to perform specialized compute tasks, such as machine learning, encryption, hashing, or other computational-intensive task. In some embodiments, for example, a compute sled 800 may offload tasks to the accelerator sled 1000 during operation. The accelerator sled 1000 includes various components similar to components of the sled 400 and/or compute sled 800, which have been identified in FIG. 10 using the same reference numbers. The description of such components provided above in regard to FIGS. 6, 7, and 8 apply to the corresponding components of the accelerator sled 1000 and is not repeated herein for clarity of the description of the accelerator sled 1000.

Figure 11:
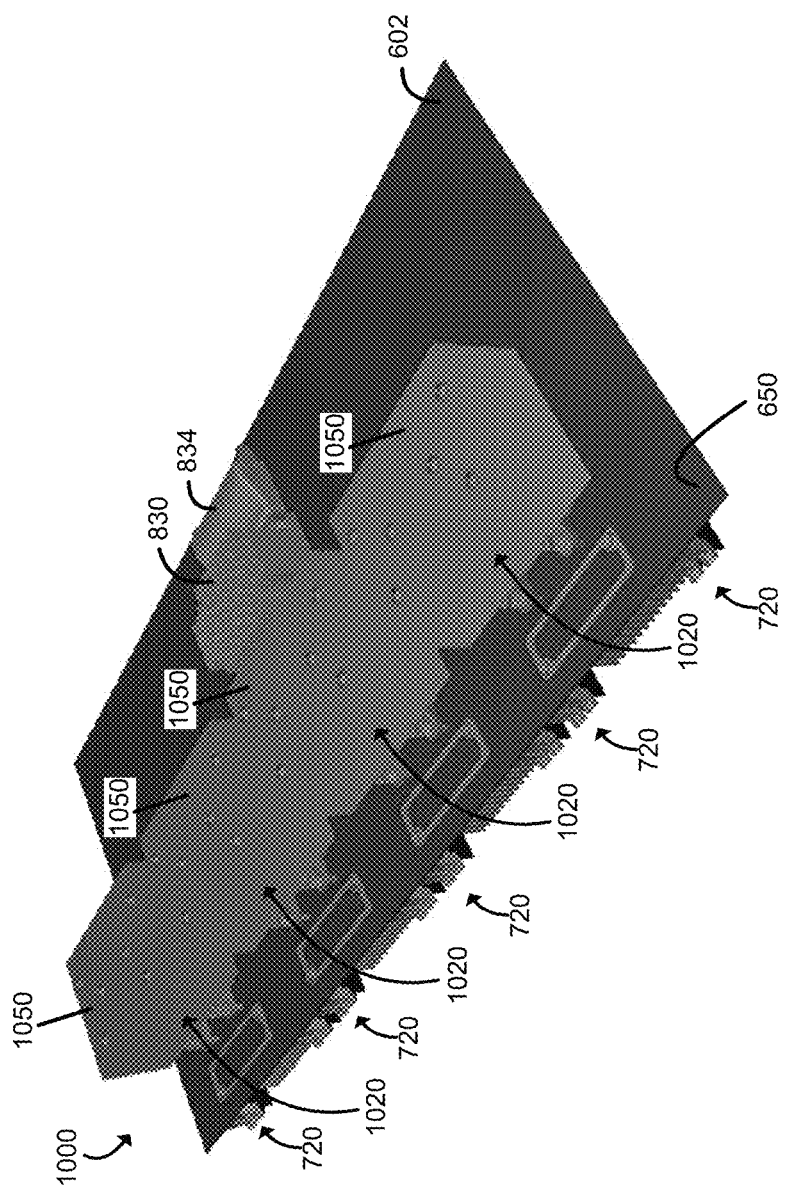
FIG. 11 is a top perspective view of at least one embodiment of the accelerator sled of FIG. 10.

In the illustrative accelerator sled 1000, the physical resources 620 are embodied as accelerator circuits 1020. Although only two accelerator circuits 1020 are shown in FIG. 10, it should be appreciated that the accelerator sled 1000 may include additional accelerator circuits 1020 in other embodiments. For example, as shown in FIG. 11, the accelerator sled 1000 may include four accelerator circuits 1020 in some embodiments. The accelerator circuits 1020 may be embodied as any type of processor, co-processor, compute circuit, or other device capable of performing compute or processing operations. For example, the accelerator circuits 1020 may be embodied as, for example, field programmable gate arrays (FPGA), application-specific integrated circuits (ASICs), security co-processors, graphics processing units (GPUs), machine learning circuits, or other specialized processors, controllers, devices, and/or circuits.

In some embodiments, the accelerator sled 1000 may also include an accelerator-to-accelerator interconnect 1042. Similar to the resource-to-resource interconnect 624 of the sled 600 discussed above, the accelerator-to-accelerator interconnect 1042 may be embodied as any type of communication interconnect capable of facilitating accelerator-to-accelerator communications. In the illustrative embodiment, the accelerator-to-accelerator interconnect 1042 is embodied as a high-speed point-to-point interconnect (e.g., faster than the I/O subsystem 622). For example, the accelerator-to-accelerator interconnect 1042 may be embodied as a QuickPath Interconnect (QPI), an UltraPath Interconnect (UPI), or other high-speed point-to-point interconnect dedicated to processor-to-processor communications. In some embodiments, the accelerator circuits 1020 may be daisy-chained with a primary accelerator circuit 1020 connected to the NIC 832 and memory 720 through the I/O subsystem 622 and a secondary accelerator circuit 1020 connected to the NIC 832 and memory 720 through a primary accelerator circuit 1020.

Referring now to FIG. 11, an illustrative embodiment of the accelerator sled 1000 is shown. As discussed above, the accelerator circuits 1020, communication circuit 830, and optical data connector 834 are mounted to the top side 650 of the chassis-less circuit board substrate 602. Again, the individual accelerator circuits 1020 and communication circuit 830 are mounted to the top side 650 of the chassis-less circuit board substrate 602 such that no two heat-producing, electrical components shadow each other as discussed above. The memory devices 720 of the accelerator sled 1000 are mounted to the bottom side 750 of the of the chassis-less circuit board substrate 602 as discussed above in regard to the sled 600. Although mounted to the bottom side 750, the memory devices 720 are communicatively coupled to the accelerator circuits 1020 located on the top side 650 via the I/O subsystem 622 (e.g., through vias). Further, each of the accelerator circuits 1020 may include a heatsink 1070 that is larger than a traditional heatsink used in a server. As discussed above with reference to the heatsinks 870, the heatsinks 1070 may be larger than tradition heatsinks because of the "free" area provided by the memory devices 750 being located on the bottom side 750 of the chassis-less circuit board substrate 602 rather than on the top side 650.

Figure 12:
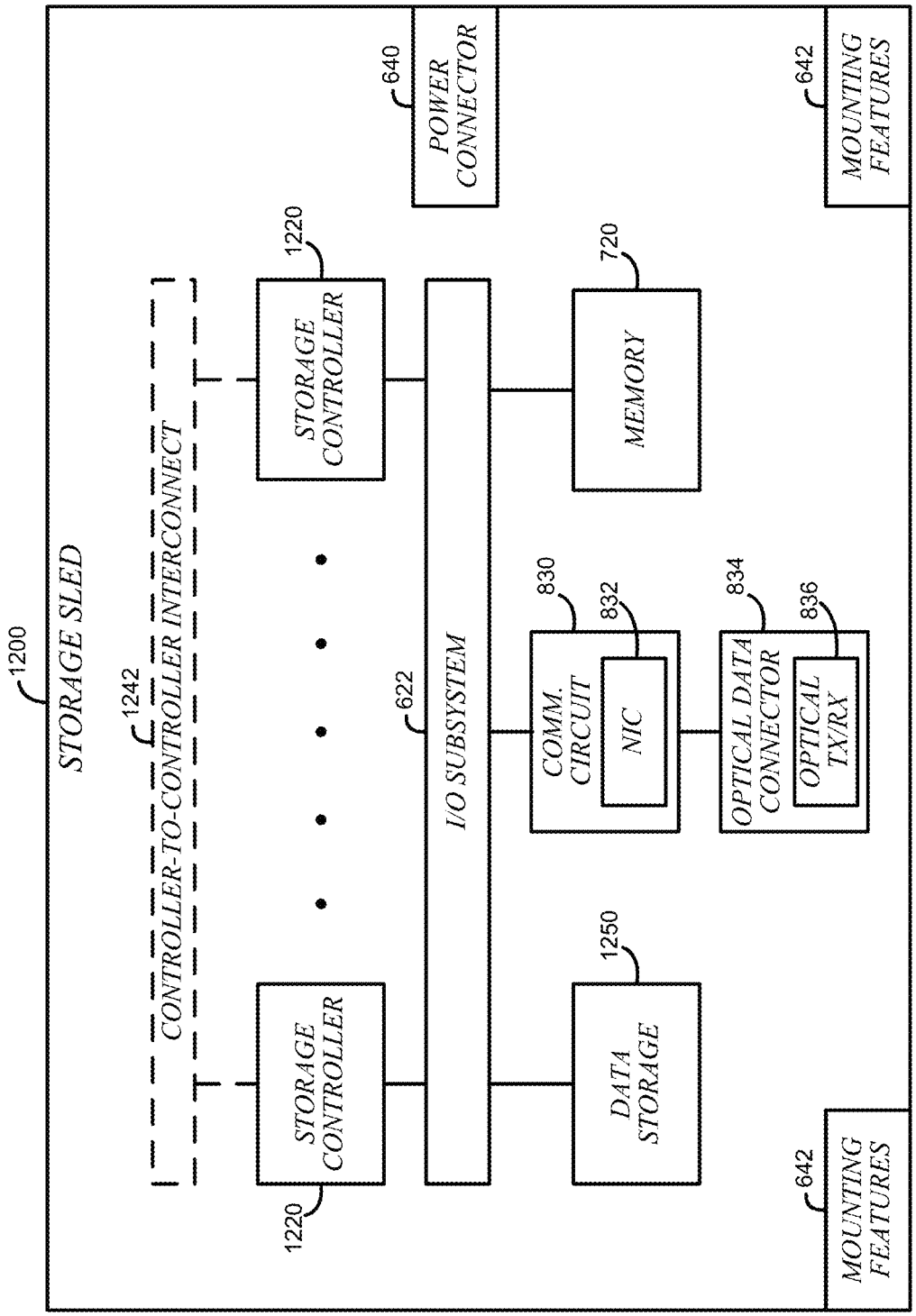
FIG. 12 is a simplified block diagram of at least one embodiment of a storage sled usable in the data center of FIG. 1.

Referring now to FIG. 12, in some embodiments, the sled 400 may be embodied as a storage sled 1200. The storage sled 1200 is optimized, or otherwise configured, to store data in a data storage 1250 local to the storage sled 1200. For example, during operation, a compute sled 800 or an accelerator sled 1000 may store and retrieve data from the data storage 1250 of the storage sled 1200. The storage sled 1200 includes various components similar to components of the sled 400 and/or the compute sled 800, which have been identified in FIG. 12 using the same reference numbers. The description of such components provided above in regard to FIGS. 6, 7, and 8 apply to the corresponding components of the storage sled 1200 and is not repeated herein for clarity of the description of the storage sled 1200.

In the illustrative storage sled 1200, the physical resources 620 are embodied as storage controllers 1220. Although only two storage controllers 1220 are shown in FIG. 12, it should be appreciated that the storage sled 1200 may include additional storage controllers 1220 in other embodiments. The storage controllers 1220 may be embodied as any type of processor, controller, or control circuit capable of controlling the storage and retrieval of data into the data storage 1250 based on requests received via the communication circuit 830. In the illustrative embodiment, the storage controllers 1220 are embodied as relatively low-power processors or controllers. For example, in some embodiments, the storage controllers 1220 may be configured to operate at a power rating of about 75 watts.

In some embodiments, the storage sled 1200 may also include a controller-to-controller interconnect 1242. Similar to the resource-to-resource interconnect 624 of the sled 400 discussed above, the controller-to-controller interconnect 1242 may be embodied as any type of communication interconnect capable of facilitating controller-to-controller communications. In the illustrative embodiment, the controller-to-controller interconnect 1242 is embodied as a high-speed point-to-point interconnect (e.g., faster than the I/O subsystem 622). For example, the controller-to-controller interconnect 1242 may be embodied as a QuickPath Interconnect (QPI), an UltraPath Interconnect (UPI), or other high-speed point-to-point interconnect dedicated to processor-to-processor communications.

Figure 13:
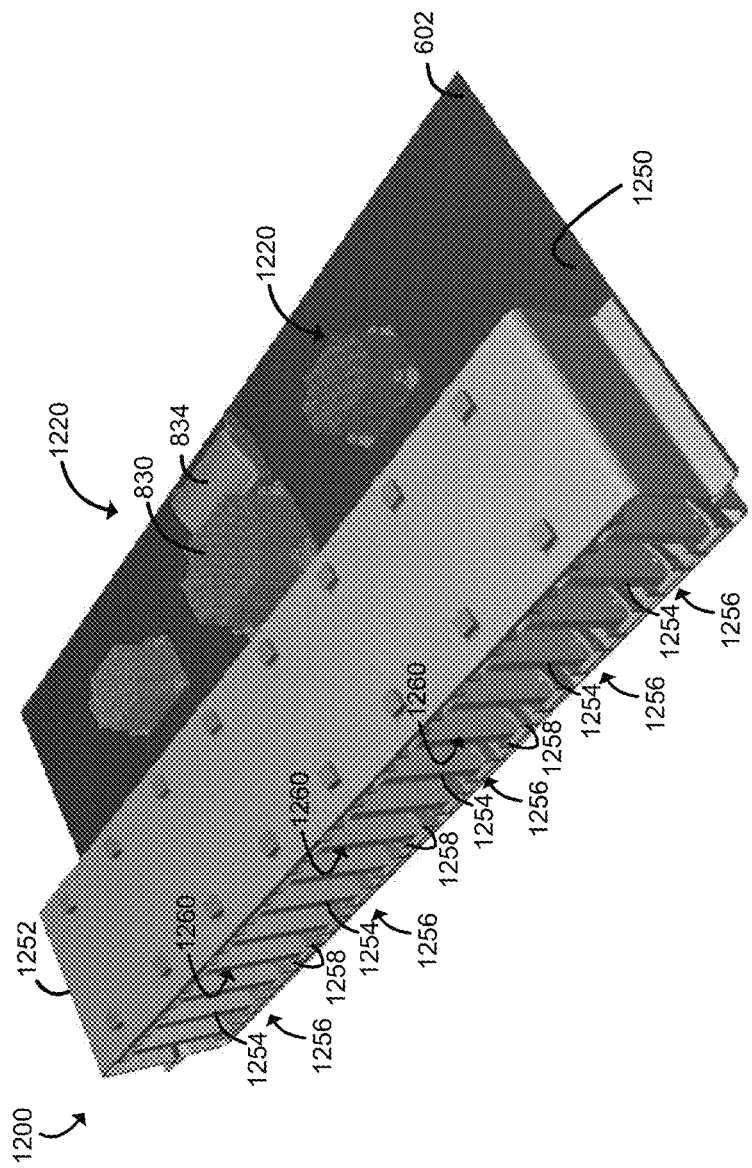
FIG. 13 is a top perspective view of at least one embodiment of the storage sled of FIG. 12.

Referring now to FIG. 13, an illustrative embodiment of the storage sled 1200 is shown. In the illustrative embodiment, the data storage 1250 is embodied as, or otherwise includes, a storage cage 1252 configured to house one or more solid state drives (SSDs) 1254. To do so, the storage cage 1252 includes a number of mounting slots 1256, each of which is configured to receive a corresponding solid state drive 1254. Each of the mounting slots 1256 includes a number of drive guides 1258 that cooperate to define an access opening 1260 of the corresponding mounting slot 1256. The storage cage 1252 is secured to the chassis-less circuit board substrate 602 such that the access openings face away from (i.e., toward the front of) the chassis-less circuit board substrate 602. As such, solid state drives 1254 are accessible while the storage sled 1200 is mounted in a corresponding rack 204. For example, a solid state drive 1254 may be swapped out of a rack 240 (e.g., via a robot) while the storage sled 1200 remains mounted in the corresponding rack 240.

The storage cage 1252 illustratively includes sixteen mounting slots 1256 and is capable of mounting and storing sixteen solid state drives 1254. Of course, the storage cage 1252 may be configured to store additional or fewer solid state drives 1254 in other embodiments. Additionally, in the illustrative embodiment, the solid state drivers are mounted vertically in the storage cage 1252, but may be mounted in the storage cage 1252 in a different orientation in other embodiments. Each solid state drive 1254 may be embodied as any type of data storage device capable of storing long term data. To do so, the solid state drives 1254 may include volatile and non-volatile memory devices discussed above.

As shown in FIG. 13, the storage controllers 1220, the communication circuit 830, and the optical data connector 834 are illustratively mounted to the top side 650 of the chassis-less circuit board substrate 602. Again, as discussed above, any suitable attachment or mounting technology may be used to mount the electrical components of the storage sled 1200 to the chassis-less circuit board substrate 602 including, for example, sockets (e.g., a processor socket), holders, brackets, soldered connections, and/or other mounting or securing techniques.

As discussed above, the individual storage controllers 1220 and the communication circuit 830 are mounted to the top side 650 of the chassis-less circuit board substrate 602 such that no two heat-producing, electrical components shadow each other. For example, the storage controllers 1220 and the communication circuit 830 are mounted in corresponding locations on the top side 650 of the chassis-less circuit board substrate 602 such that no two of those electrical components are linearly in-line with other along the direction of the airflow path 608.

The memory devices 720 of the storage sled 1200 are mounted to the bottom side 750 of the of the chassis-less circuit board substrate 602 as discussed above in regard to the sled 400. Although mounted to the bottom side 750, the memory devices 720 are communicatively coupled to the storage controllers 1220 located on the top side 650 via the I/O subsystem 622. Again, because the chassis-less circuit board substrate 602 is embodied as a double-sided circuit board, the memory devices 720 and the storage controllers 1220 may be communicatively coupled by one or more vias, connectors, or other mechanisms extending through the chassis-less circuit board substrate 602. Each of the storage controllers 1220 includes a heatsink 1270 secured thereto. As discussed above, due to the improved thermal cooling characteristics of the chassis-less circuit board substrate 602 of the storage sled 1200, none of the heatsinks 1270 include cooling fans attached thereto. That is, each of the heatsinks 1270 is embodied as a fan-less heatsink.

Figure 14:
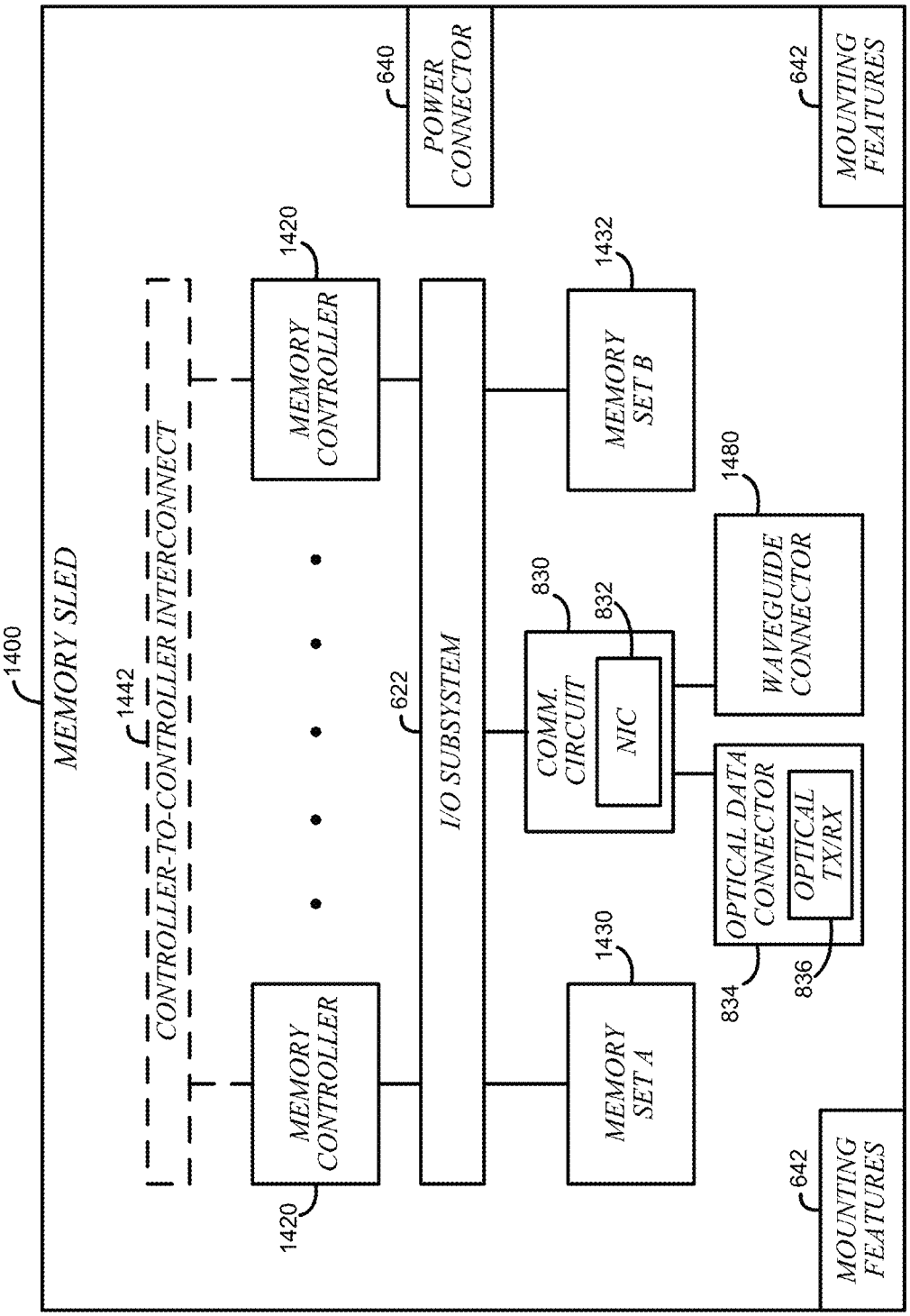
FIG. 14 is a simplified block diagram of at least one embodiment of a memory sled usable in the data center of FIG. 1.

Referring now to FIG. 14, in some embodiments, the sled 400 may be embodied as a memory sled 1400. The storage sled 1400 is optimized, or otherwise configured, to provide other sleds 400 (e.g., compute sleds 800, accelerator sleds 1000, etc.) with access to a pool of memory (e.g., in two or more sets 1430, 1432 of memory devices 720) local to the memory sled 1200. For example, during operation, a compute sled 800 or an accelerator sled 1000 may remotely write to and/or read from one or more of the memory sets 1430, 1432 of the memory sled 1200 using a logical address space that maps to physical addresses in the memory sets 1430, 1432. The memory sled 1400 includes various components similar to components of the sled 400 and/or the compute sled 800, which have been identified in FIG. 14 using the same reference numbers. The description of such components provided above in regard to FIGS. 6, 7, and 8 apply to the corresponding components of the memory sled 1400 and is not repeated herein for clarity of the description of the memory sled 1400.

In the illustrative memory sled 1400, the physical resources 620 are embodied as memory controllers 1420. Although only two memory controllers 1420 are shown in FIG. 14, it should be appreciated that the memory sled 1400 may include additional memory controllers 1420 in other embodiments. The memory controllers 1420 may be embodied as any type of processor, controller, or control circuit capable of controlling the writing and reading of data into the memory sets 1430, 1432 based on requests received via the communication circuit 830. In the illustrative embodiment, each storage controller 1220 is connected to a corresponding memory set 1430, 1432 to write to and read from memory devices 720 within the corresponding memory set 1430, 1432 and enforce any permissions (e.g., read, write, etc.) associated with sled 400 that has sent a request to the memory sled 1400 to perform a memory access operation (e.g., read or write).

In some embodiments, the memory sled 1400 may also include a controller-to-controller interconnect 1442. Similar to the resource-to-resource interconnect 624 of the sled 400 discussed above, the controller-to-controller interconnect 1442 may be embodied as any type of communication interconnect capable of facilitating controller-to-controller communications. In the illustrative embodiment, the controller-to-controller interconnect 1442 is embodied as a high-speed point-to-point interconnect (e.g., faster than the I/O subsystem 622). For example, the controller-to-controller interconnect 1442 may be embodied as a QuickPath Interconnect (QPI), an UltraPath Interconnect (UPI), or other high-speed point-to-point interconnect dedicated to processor-to-processor communications. As such, in some embodiments, a memory controller 1420 may access, through the controller-to-controller interconnect 1442, memory that is within the memory set 1432 associated with another memory controller 1420. In some embodiments, a scalable memory controller is made of multiple smaller memory controllers, referred to herein as "chiplets", on a memory sled (e.g., the memory sled 1400). The chiplets may be interconnected (e.g., using EMIB (Embedded Multi-Die Interconnect Bridge)). The combined chiplet memory controller may scale up to a relatively large number of memory controllers and I/O ports, (e.g., up to 16 memory channels). In some embodiments, the memory controllers 1420 may implement a memory interleave (e.g., one memory address is mapped to the memory set 1430, the next memory address is mapped to the memory set 1432, and the third address is mapped to the memory set 1430, etc.). The interleaving may be managed within the memory controllers 1420, or from CPU sockets (e.g., of the compute sled 800) across network links to the memory sets 1430, 1432, and may improve the latency associated with performing memory access operations as compared to accessing contiguous memory addresses from the same memory device.

Further, in some embodiments, the memory sled 1400 may be connected to one or more other sleds 400 (e.g., in the same rack 240 or an adjacent rack 240) through a waveguide, using the waveguide connector 1480. In the illustrative embodiment, the waveguides are 64 millimeter waveguides that provide 16 Rx (i.e., receive) lanes and 16 Rt (i.e., transmit) lanes. Each lane, in the illustrative embodiment, is either 16 Ghz or 32 Ghz. In other embodiments, the frequencies may be different. Using a waveguide may provide high throughput access to the memory pool (e.g., the memory sets 1430, 1432) to another sled (e.g., a sled 400 in the same rack 240 or an adjacent rack 240 as the memory sled 1400) without adding to the load on the optical data connector 834.

Figure 15:
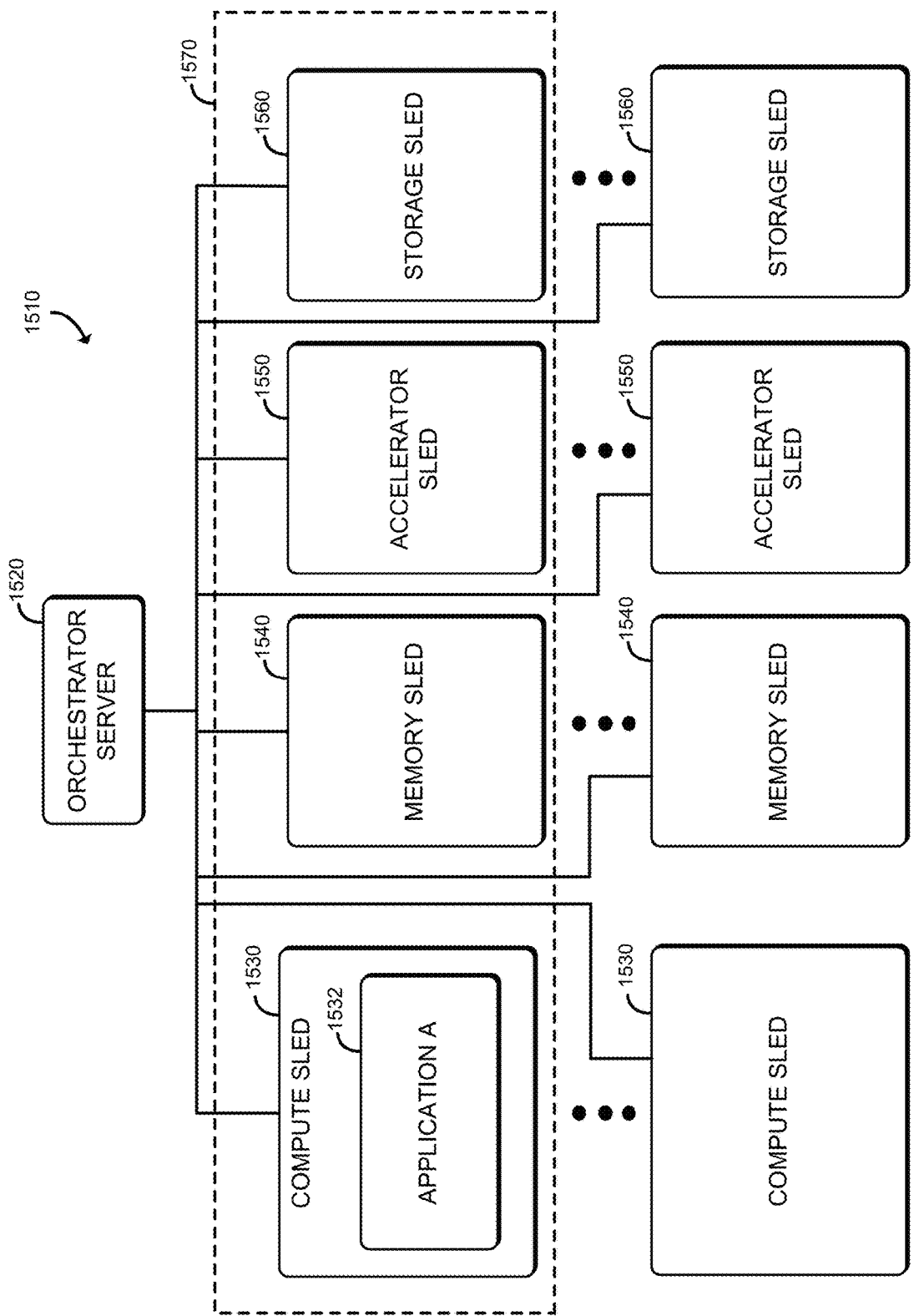
FIG. 15 is a simplified block diagram of a system that may be established within the data center of FIG. 1 to execute workloads with managed nodes composed of disaggregated resources.

Referring now to FIG. 15, a system for executing one or more workloads (e.g., applications) may be implemented in accordance with the data center 100. In the illustrative embodiment, the system 1510 includes an orchestrator server 1520, which may be embodied as a managed node comprising a compute device (e.g., a compute sled 800) executing management software (e.g., a cloud operating environment, such as OpenStack) that is communicatively coupled to multiple sleds 400 including a large number of compute sleds 1530 (e.g., each similar to the compute sled 800), memory sleds 1540 (e.g., each similar to the memory sled 1400), accelerator sleds 1550 (e.g., each similar to the memory sled 1000), and storage sleds 1560 (e.g., each similar to the storage sled 1200). One or more of the sleds 1530, 1540, 1550, 1560 may be grouped into a managed node 1570, such as by the orchestrator server 1520, to collectively perform a workload (e.g., an application 1532 executed in a virtual machine or in a container). The managed node 1570 may be embodied as an assembly of physical resources 620, such as processors 820, memory resources 720, accelerator circuits 1020, or data storage 1250, from the same or different sleds 400. Further, the managed node may be established, defined, or "spun up" by the orchestrator server 1520 at the time a workload is to be assigned to the managed node or at any other time, and may exist regardless of whether any workloads are presently assigned to the managed node. In the illustrative embodiment, the orchestrator server 1520 may selectively allocate and/or deallocate physical resources 620 from the sleds 400 and/or add or remove one or more sleds 400 from the managed node 1570 as a function of quality of service (QoS) targets (e.g., performance targets associated with a throughput, latency, instructions per second, etc.) associated with a service level agreement for the workload (e.g., the application 1532). In doing so, the orchestrator server 1520 may receive telemetry data indicative of performance conditions (e.g., throughput, latency, instructions per second, etc.) in each sled 400 of the managed node 1570 and compare the telemetry data to the quality of service targets to determine whether the quality of service targets are being satisfied. If the so, the orchestrator server 1520 may additionally determine whether one or more physical resources may be deallocated from the managed node 1570 while still satisfying the QoS targets, thereby freeing up those physical resources for use in another managed node (e.g., to execute a different workload). Alternatively, if the QoS targets are not presently satisfied, the orchestrator server 1520 may determine to dynamically allocate additional physical resources to assist in the execution of the workload (e.g., the application 1532) while the workload is executing Additionally, in some embodiments, the orchestrator server 1520 may identify trends in the resource utilization of the workload (e.g., the application 1532), such as by identifying phases of execution (e.g., time periods in which different operations, each having different resource utilizations characteristics, are performed) of the workload (e.g., the application 1532) and pre-emptively identifying available resources in the data center 100 and allocating them to the managed node 1570 (e.g., within a predefined time period of the associated phase beginning). In some embodiments, the orchestrator server 1520 may model performance based on various latencies and a distribution scheme to place workloads among compute sleds and other resources (e.g., accelerator sleds, memory sleds, storage sleds) in the data center 100. For example, the orchestrator server 1520 may utilize a model that accounts for the performance of resources on the sleds 400 (e.g., FPGA performance, memory access latency, etc.) and the performance (e.g., congestion, latency, bandwidth) of the path through the network to the resource (e.g., FPGA). As such, the orchestrator server 1520 may determine which resource(s) should be used with which workloads based on the total latency associated with each potential resource available in the data center 100 (e.g., the latency associated with the performance of the resource itself in addition to the latency associated with the path through the network between the compute sled executing the workload and the sled 400 on which the resource is located).

In some embodiments, the orchestrator server 1520 may generate a map of heat generation in the data center 100 using telemetry data (e.g., temperatures, fan speeds, etc.) reported from the sleds 400 and allocate resources to managed nodes as a function of the map of heat generation and predicted heat generation associated with different workloads, to maintain a target temperature and heat distribution in the data center 100. Additionally or alternatively, in some embodiments, the orchestrator server 1520 may organize received telemetry data into a hierarchical model that is indicative of a relationship between the managed nodes (e.g., a spatial relationship such as the physical locations of the resources of the managed nodes within the data center 100 and/or a functional relationship, such as groupings of the managed nodes by the customers the managed nodes provide services for, the types of functions typically performed by the managed nodes, managed nodes that typically share or exchange workloads among each other, etc.). Based on differences in the physical locations and resources in the managed nodes, a given workload may exhibit different resource utilizations (e.g., cause a different internal temperature, use a different percentage of processor or memory capacity) across the resources of different managed nodes. The orchestrator server 1520 may determine the differences based on the telemetry data stored in the hierarchical model and factor the differences into a prediction of future resource utilization of a workload if the workload is reassigned from one managed node to another managed node, to accurately balance resource utilization in the data center 100.

To reduce the computational load on the orchestrator server 1520 and the data transfer load on the network, in some embodiments, the orchestrator server 1520 may send self-test information to the sleds 400 to enable each sled 400 to locally (e.g., on the sled 400) determine whether telemetry data generated by the sled 400 satisfies one or more conditions (e.g., an available capacity that satisfies a predefined threshold, a temperature that satisfies a predefined threshold, etc.). Each sled 400 may then report back a simplified result (e.g., yes or no) to the orchestrator server 1520, which the orchestrator server 1520 may utilize in determining the allocation of resources to managed nodes.

Figure 16:
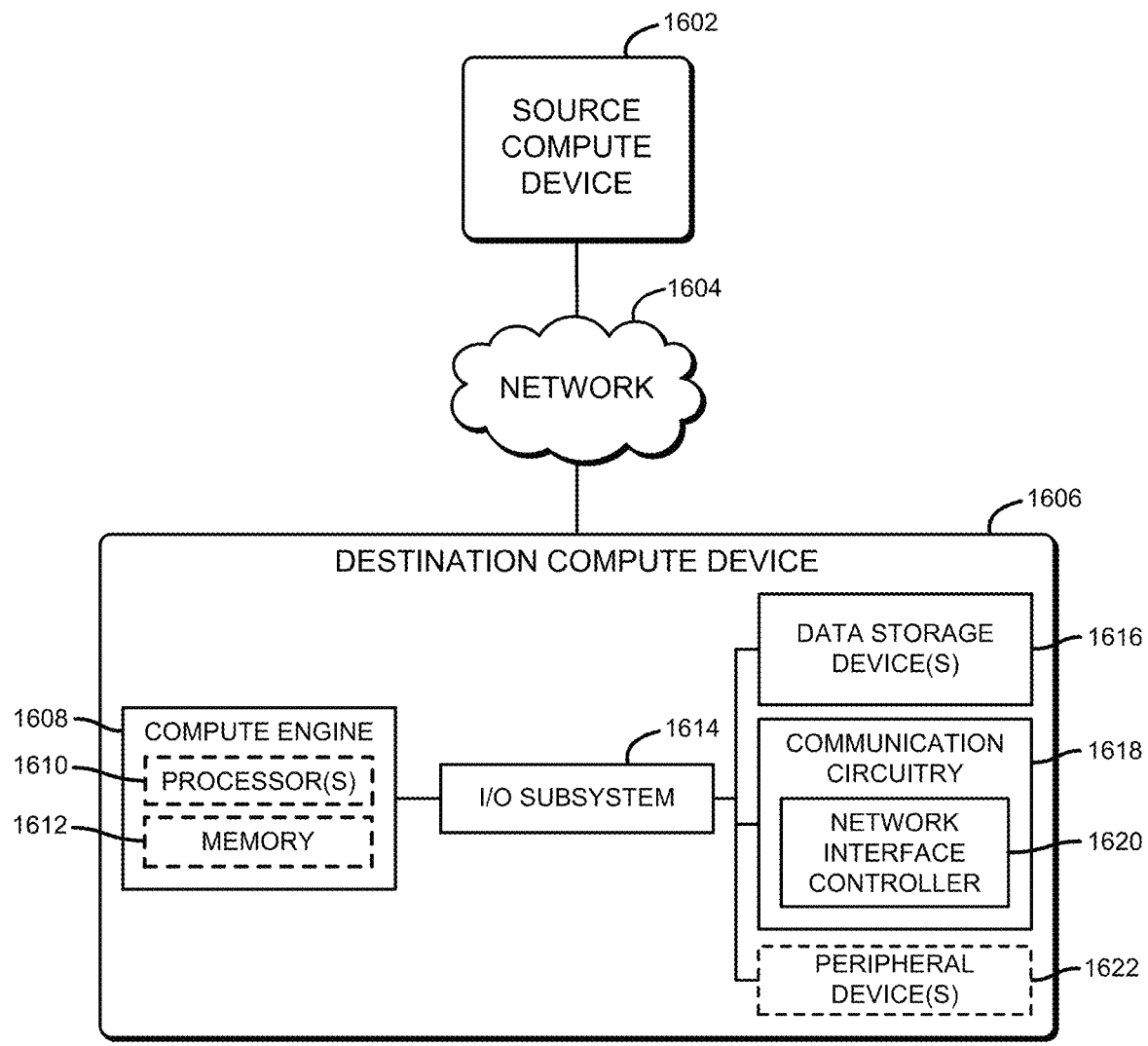
FIG. 16 is a simplified block diagram of at least one embodiment of a system for managing exact match hash table growth that includes one or more compute devices communicatively coupled to a network computing device via a network.

Referring now to FIG. 16, in an illustrative embodiment, a system 1600 for managing exact match hash table growth includes a network computing device 1606 communicatively coupled to one or more compute devices 1602 via a network 1604. In use, the network computing device 1606 transmits and receives network traffic (e.g., network packets, frames, etc.) to/from the compute device(s) 1602. Upon receipt of a network packet, the network computing device 1606 determines one or more process flows for processing of the network packet. To do so, the network computing device 1606 applies a pipelined hash table processing function using a process flow key to return a hash value. Depending on the embodiment, the process flow key may be generated based on one or more properties associated with the received network packet, such as one or more of a source Internet Protocol (IP) address, a destination IP address, a source port number, a destination port number, an application associated with the network packet, a workflow type of the network packet, a protocol associated with the network packet, and/or other data associated with the network packet.

The resulting hash value may be used to identify an entry pointer usable to indicate an entry of an entry record of multiple entry records stored at a particular location (e.g., an index value, a pointer value, a physical address value, a logical address value, etc.) in memory of the network computing device 1606 as a function of the hash value and a number of hash bucket records stored in the memory. As noted previously, the process flow key is usable to identify one or more process flows for processing of the network packet. Accordingly, the process flow key should be large enough to accommodate the large number of process flows (e.g., 1, 100, 100 k, etc.). However, some resulting hash values of pipelined hash table processing functions can result in hash collisions (i.e., the hash generates the same hash value for more than one process flow key).

One cause of these collisions results from the hash width size being fixed. In other words, since certain bits are used to identify process flow functions, hash tables require knowing the hash width size up-front. As such, a hash configuration change may be necessary to alleviate such collisions over time. For example, a number of bits of a hash used to pick the bucket may be changed to grow the hash table. However, such growth can result in changing the bucket associated with a given process flow key. Accordingly, unlike present technologies, the network computing device 1606 is configured to implement virtual to physical bucket mapping to allow hash table buckets to be allocated non-contiguously. Additionally, the network computing device 1606 is configured to apply a linear hashing technique on the hash address to amortize the rebalancing cost of widening the hash space.

The network computing device 1606 may be embodied as any type of computation or computer device capable of performing the functions described herein, including, without limitation, a computer, a server (e.g., stand-alone, rack-mounted, blade, etc.), one or more sleds in a data center, an enhanced network interface controller (NIC) (e.g., a host fabric interface (HFI)), a network appliance (e.g., physical or virtual), a router, switch (e.g., a disaggregated switch, a rack-mounted switch, a standalone switch, a fully managed switch, a partially managed switch, a full-duplex switch, and/or a half-duplex communication mode enabled switch), a web appliance, a distributed computing system, a processor-based system, and/or a multiprocessor system.

As shown in FIG. 16, the illustrative network computing device 1606 includes a compute engine 1608, an I/O subsystem 1614, one or more data storage devices 1616, communication circuitry 1618, and, in some embodiments, one or more peripheral devices 1622. It should be appreciated that the network computing device 1606 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component.

The compute engine 1608 may be embodied as any type of device or collection of devices capable of performing the various compute functions as described herein. In some embodiments, the compute engine 1608 may be embodied as a single device such as an integrated circuit, an embedded system, a field-programmable-array (FPGA), a system-on-a-chip (SOC), an application specific integrated circuit (ASIC), reconfigurable hardware or hardware circuitry, or other specialized hardware to facilitate performance of the functions described herein. Additionally, in some embodiments, the compute engine 1608 may include, or may be embodied as, one or more processors 1610 (i.e., one or more central processing units (CPUs)) and memory 1612.

The processor(s) 1610 may be embodied as any type of processor capable of performing the functions described herein. For example, the processor(s) 1610 may be embodied as a single-core processor, a multi-core processor, a digital signal processor, a microcontroller, or other processor or processing/controlling circuit. In some embodiments, the processor(s) 1610 may be embodied as, include, or otherwise be coupled to a field programmable gate array (FPGA), an application specific integrated circuit (ASIC), reconfigurable hardware or hardware circuitry, or other specialized hardware to facilitate performance of the functions described herein.

The memory 1612 may be embodied as any type of volatile (e.g., dynamic random access memory (DRAM), etc.) or non-volatile memory or data storage capable of performing the functions described herein. It should be appreciated that the memory 1612 may include main memory (i.e., a primary memory) and/or cache memory (i.e., memory that can be accessed more quickly than the main memory). Volatile memory may be a storage medium that requires power to maintain the state of data stored by the medium. Non-limiting examples of volatile memory may include various types of random access memory (RAM), such as dynamic random access memory (DRAM) or static random access memory (SRAM).

The compute engine 1608 is communicatively coupled to other components of the network computing device 1606 via the I/O subsystem 1614, which may be embodied as circuitry and/or components to facilitate input/output operations with the processor 1610, the memory 1612, and other components of the network computing device 1606. For example, the I/O subsystem 1614 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 1614 may form a portion of a system-on-a-chip (SoC) and be incorporated, along with one or more of the processor 1610, the memory 1612, and other components of the network computing device 1606, on a single integrated circuit chip.

The one or more data storage devices 1616 may be embodied as any type of storage device(s) configured for short-term or long-term storage of data, such as, for example, memory devices and circuits, memory cards, hard disk drives, solid-state drives, or other data storage devices. Each data storage device 1616 may include a system partition that stores data and firmware code for the data storage device 1616. Each data storage device 1616 may also include an operating system partition that stores data files and executables for an operating system.

The communication circuitry 1618 may be embodied as any communication circuit, device, or collection thereof, capable of enabling communications between the network computing device 1606 and other computing devices, such as the compute devices 1602, as well as any network communication enabling devices, such as an access point, network switch/router, etc., to allow communication over the network 1604. Accordingly, the communication circuitry 1618 may be configured to use any one or more communication technologies (e.g., wireless or wired communication technologies) and associated protocols (e.g., Ethernet, Bluetooth®, Wi-Fi®, WiMAX, LTE, 5G, etc.) to effect such communication.

It should be appreciated that, in some embodiments, the communication circuitry 1618 may include specialized circuitry, hardware, or combination thereof to perform pipeline logic (e.g., hardware algorithms) for performing the functions described herein, including applying the hash functions, processing network packets (e.g., parse received network packets, determine destination computing devices for each received network packets, forward the network packets to a particular buffer queue of a respective host buffer of the network computing device 1606, etc.), performing computational functions, etc.

In some embodiments, performance of one or more of the functions of communication circuitry 1618 as described herein may be performed by specialized circuitry, hardware, or combination thereof of the communication circuitry 1618, which may be embodied as a system-on-a-chip (SoC) or otherwise form a portion of a SoC of the network computing device 1606 (e.g., incorporated on a single integrated circuit chip along with a processor 1610, the memory 1612, and/or other components of the network computing device 1606). Alternatively, in some embodiments, the specialized circuitry, hardware, or combination thereof may be embodied as one or more discrete processing units of the network computing device 1606, each of which may be capable of performing one or more of the functions described herein.

The illustrative communication circuitry 1618 includes a NIC 1620, which may also be referred to as a host fabric interface (HFI) in some embodiments. The NIC 1620 may be embodied as one or more add-in-boards, daughtercards, network interface cards, controller chips, chipsets, or other devices that may be used by the network computing device 1606 to connect with another compute device (e.g., one of the compute devices 1602). In some embodiments, the NIC 1620 may be embodied as part of a system-on-a-chip (SoC) that includes one or more processors, or included on a multichip package that also contains one or more processors. In some embodiments, the NIC 1620 may include a local processor (not shown) and/or a local memory (not shown) that are both local to the NIC 1620. In such embodiments, the local processor of the NIC 1620 may be capable of performing one or more of the functions of a processor 1610 described herein. Additionally or alternatively, in such embodiments, the local memory of the NIC 1620 may be integrated into one or more components of the network computing device 1606 at the board level, socket level, chip level, and/or other levels.

The one or more peripheral devices 1622 may include any type of device that is usable to input information into the network computing device 1606 and/or receive information from the network computing device 1606. The peripheral devices 1622 may be embodied as any auxiliary device usable to input information into the network computing device 1606, such as a keyboard, a mouse, a microphone, a barcode reader, an image scanner, etc., or output information from the network computing device 1606, such as a display, a speaker, graphics circuitry, a printer, a projector, etc. It should be appreciated that, in some embodiments, one or more of the peripheral devices 1622 may function as both an input device and an output device (e.g., a touchscreen display, a digitizer on top of a display screen, etc.). It should be further appreciated that the types of peripheral devices 1622 connected to the network computing device 1606 may depend on, for example, the type and/or intended use of the network computing device 1606. Additionally or alternatively, in some embodiments, the peripheral devices 1622 may include one or more ports, such as a USB port, for example, for connecting external peripheral devices to the network computing device 1606.

The compute device(s) 1602 may be embodied as any type of computation or computer device capable of performing the functions described herein, including, without limitation, a smartphone, a mobile computing device, a tablet computer, a laptop computer, a notebook computer, a computer, a server (e.g., stand-alone, rack-mounted, blade, etc.), a sled (e.g., a compute sled, an accelerator sled, a storage sled, a memory sled, etc.), a network appliance (e.g., physical or virtual), a web appliance, a distributed computing system, a processor-based system, and/or a multiprocessor system. While not illustratively shown, it should be appreciated that each of the compute devices 1602 includes similar and/or like components to those of the illustrative network computing device 1606. As such, figures and descriptions of the like components are not repeated herein for clarity of the description with the understanding that the description of the corresponding components provided above in regard to the network computing device 1606 applies equally to the corresponding components of the compute devices 1602. Of course, it should be appreciated that the computing devices may include additional and/or alternative components, depending on the embodiment.

The network 1604 may be embodied as any type of wired or wireless communication network, including but not limited to a wireless local area network (WLAN), a wireless personal area network (WPAN), a cellular network (e.g., Global System for Mobile Communications (GSM), Long-Term Evolution (LTE), etc.), a telephony network, a digital subscriber line (DSL) network, a cable network, a local area network (LAN), a wide area network (WAN), a global network (e.g., the Internet), or any combination thereof. It should be appreciated that, in such embodiments, the network 1604 may serve as a centralized network and, in some embodiments, may be communicatively coupled to another network (e.g., the Internet). Accordingly, the network 1604 may include a variety of other virtual and/or physical network computing devices (e.g., routers, switches, network hubs, servers, storage devices, compute devices, etc.), as needed to facilitate communication between the network computing device 1606 and the respective compute devices 1602, which are not shown to preserve clarity of the description.

Figure 17:
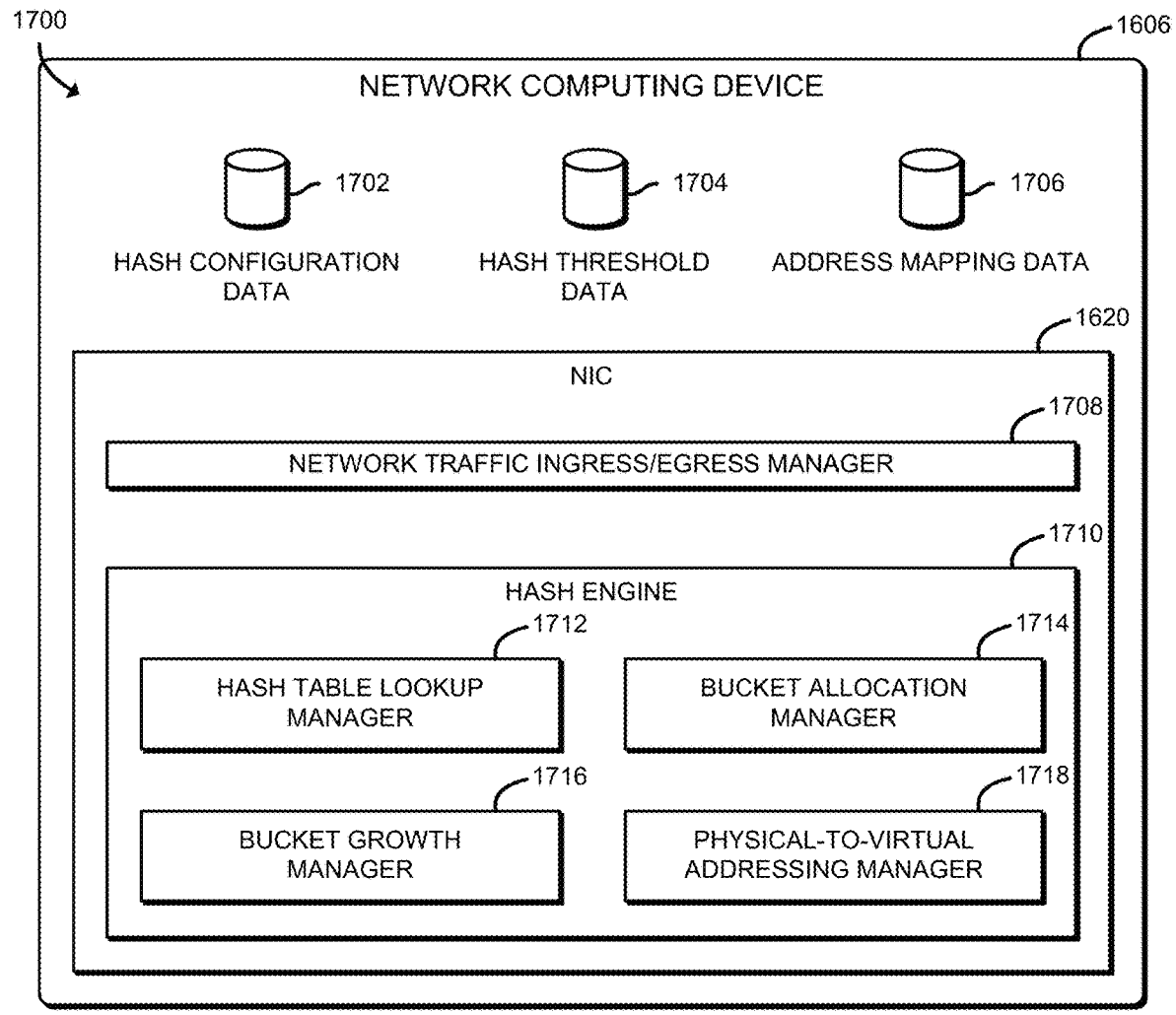
FIG. 17 is a simplified block diagram of at least one embodiment of an environment of the network computing device of the system of FIG. 16.

Referring now to FIG. 17, in use, the network computing device 1606 establishes an environment 1700 during operation. The illustrative environment 1700 includes a network traffic ingress/egress manager 1708 and a hash engine 1710. The various components of the environment 1700 may be embodied as hardware, firmware, software, or a combination thereof. As such, in some embodiments, one or more of the components of the environment 1700 may be embodied as circuitry or collection of electrical devices (e.g., network traffic ingress/egress management circuitry 1708, hash engine circuitry 1710, etc.).

It should be appreciated that, in such embodiments, one or more of the network traffic ingress/egress management circuitry 1708 and the hash engine circuitry 1710 may form a portion of one or more of the compute engine 1608, the I/O subsystem 1614, the communication circuitry 1618, and/or other components of the network computing device 1606. Additionally, in some embodiments, one or more of the illustrative components may form a portion of another component and/or one or more of the illustrative components may be independent of one another. Further, in some embodiments, one or more of the components of the environment 1700 may be embodied as virtualized hardware components or emulated architecture, which may be established and maintained by the compute engine 1608 or other components of the network computing device 1606. It should be appreciated that the network computing device 1606 may include other components, sub-components, modules, sub-modules, logic, sub-logic, and/or devices commonly found in a computing device, which are not illustrated in FIG. 17 for clarity of the description.

In the illustrative environment 1700, the network computing device 1606 additionally includes hash configuration data 1702, hash threshold data 1704, and address mapping data 1706, each of which may be accessed by the various components and/or sub-components of the network computing device 1606. Further, each of the hash configuration data 1702, the hash threshold data 1704, and the address mapping data 1706 may be accessed by the various components of the network computing device 1606. Additionally, it should be appreciated that in some embodiments the data stored in, or otherwise represented by, each of the hash configuration data 1702, the hash threshold data 1704, and the address mapping data 1706 may not be mutually exclusive relative to each other. For example, in some implementations, data stored in the hash configuration data 1702 may also be stored as a portion of one or more of the hash threshold data 1704 and the address mapping data 1706, or vice versa. As such, although the various data utilized by the network computing device 1606 is described herein as particular discrete data, such data may be combined, aggregated, and/or otherwise form portions of a single or multiple data sets, including duplicative copies, in other embodiments.

The network traffic ingress/egress manager 1708, which may be embodied as hardware, firmware, software, virtualized hardware, emulated architecture, and/or a combination thereof as discussed above, is configured to receive inbound and route/transmit outbound network traffic. To do so, the illustrative network traffic ingress/egress manager 1708 is configured to facilitate inbound network communications (e.g., network traffic, network packets, network flows, etc.) to the network computing device 1606. Accordingly, the network traffic ingress/egress manager 1708 is configured to manage (e.g., create, modify, delete, etc.) connections to physical and virtual network ports (i.e., virtual network interfaces) of the network computing device 1606 (e.g., via the communication circuitry 1618), as well as the ingress buffers/queues associated therewith. Additionally, the network traffic ingress/egress manager 1708 is configured to facilitate outbound network communications (e.g., network traffic, network packet streams, network flows, etc.) from the network computing device 1606. To do so, the network traffic ingress/egress manager 1708 is configured to manage (e.g., create, modify, delete, etc.) connections to physical and virtual network ports/interfaces of the network computing device 1606 (e.g., via the communication circuitry 1618), as well as the egress buffers/queues associated therewith.

The hash engine 1710, which may be embodied as hardware, firmware, software, virtualized hardware, emulated architecture, and/or a combination thereof as discussed above, is configured to perform the hash-related functions described herein. To do so, the illustrative hash engine 1710 includes a hash table lookup manager 1712, a bucket allocation manager 1714, a bucket growth manager 1716, and a physical-to-virtual addressing manager 1718. The hash table lookup manager 1712, which may be embodied as hardware, firmware, software, virtualized hardware, emulated architecture, and/or a combination thereof as discussed above, is configured to perform the hash table lookup operations. For example, the hash table lookup manager 1712 may be configured process a process flow key to provide a hash value (i.e., an entry point) which indicates a location of an entry into a bucket, or more particularly a virtual bucket address, which is described in further detail below.

The bucket allocation manager 1714, which may be embodied as hardware, firmware, software, virtualized hardware, emulated architecture, and/or a combination thereof as discussed above, is configured to allocate non-contiguous blocks of physical memory. Such non-contiguous chunk allocation of physical memory, unlike present techniques in which during a growth of the bucket address space multiple logical hash tables span the bucket space can abut, ensures that the hash table grows by the number of requested buckets in conjunction with the table growth request (i.e., there are free buckets available at the end of the current hash table's region).

The bucket growth manager 1716, which may be embodied as hardware, firmware, software, virtualized hardware, emulated architecture, and/or a combination thereof as discussed above, is configured to manage the growth of the bucket address space. To do so, the bucket growth manager 1716 is configured to set a bucket threshold value that is used during the lookup operation. For example, the bucket growth manager 1716 is configured to determine whether a hash value is greater than the bucket threshold value, and if so, ignore the top bit of the hash value. The bucket growth manager 1716 is further configured to increase the bucket threshold value by some integer value in accordance with a number of additional buckets as may be required by a hash table growth request. Accordingly, the bucket growth manager 1716 is additionally configured to identify a number of additional bucket required to achieve the requested hash table growth (i.e., in accordance with the hash table growth request), such as may be prompted by a hash configuration change (e.g., the number of bits of a hash value used to pick the corresponding bucket has been increased).

The physical-to-virtual addressing manager 1718, which may be embodied as hardware, firmware, software, virtualized hardware, emulated architecture, and/or a combination thereof as discussed above, is configured to apply a virtual to physical mapping scheme between bucket addresses in virtual memory (i.e., virtual bucket addresses) and bucket addresses in physical memory (i.e., physical bucket addresses). In other words, the physical-to-virtual addressing manager 1718 is configured to apply virtual addressing to the bucket space. Accordingly, the hash table lookup manager 1712 can treat the hash values as virtual bucket addresses during the lookup operation, where traditionally the hash values were mapped to a physical bucket addresses.

It should be appreciated that each of the hash table lookup manager 1712, the bucket allocation manager 1714, the bucket growth manager 1716, and the physical-to-virtual addressing manager 1718 of the illustrative hash engine 1710 may be separately embodied as hardware, firmware, software, virtualized hardware, emulated architecture, and/or a combination thereof. For example, the hash table lookup manager 1712 may be embodied as a hardware component, while the bucket allocation manager 1714, the bucket growth manager 1716, and/or the physical-to-virtual addressing manager 1718 may be embodied as a virtualized hardware component or as some other combination of hardware, firmware, software, virtualized hardware, emulated architecture, and/or a combination thereof.

Figure 18:
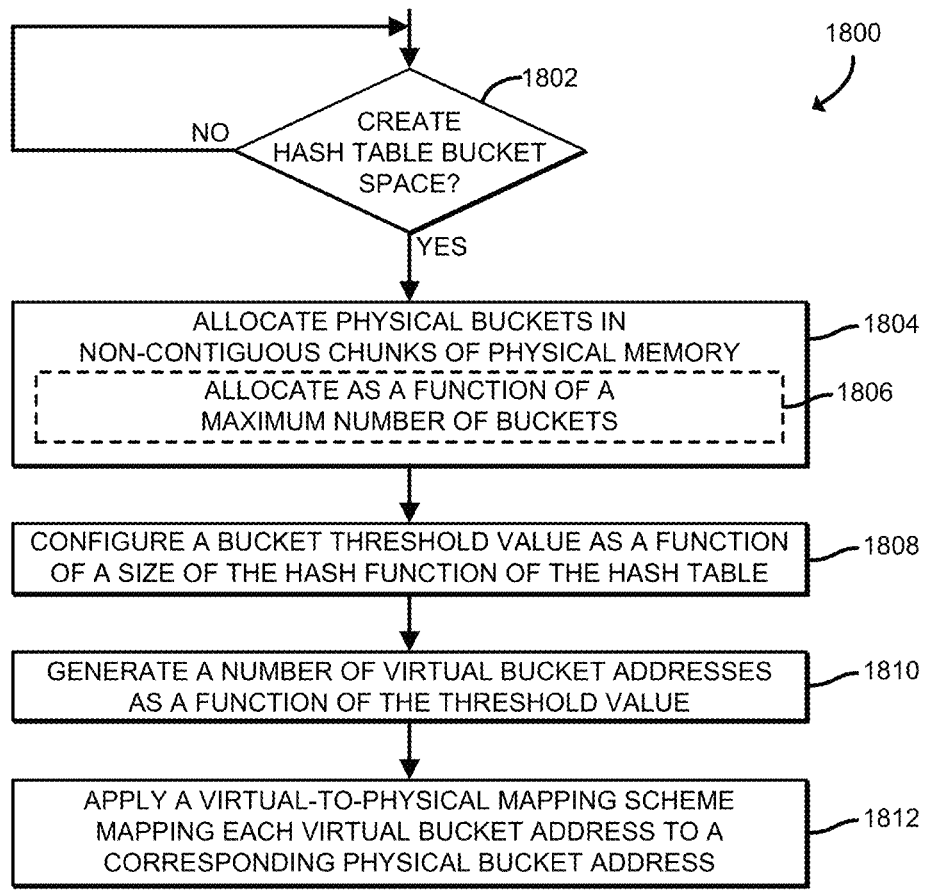
FIG. 18 is a simplified flow diagram of at least one embodiment of a method for managing an exact match hash table during the bucket space creation phase that may be executed by the network computing device of FIGS. 16 and 17.

Referring now to FIG. 18, a method 1800 for managing an exact match hash table (see, e.g., the hash table 2100 of FIG. 21) during the bucket space creation phase is shown which may be executed by a computing device (e.g., the network computing device 1606 of FIG. 16), or more particularly by a hash engine of a NIC of the network computing device 1606 (e.g., the hash engine 1710 of the NIC 1620 of FIG. 17). The method 1800 begins with block 1802, in which the network computing device 1606 determines whether to create a bucket space for a corresponding hash table. If so, the method 1800 advances to block 1804, in which the network computing device 1606 allocates a number of physical buckets in non-contiguous chunks of physical memory. In some embodiments, the network computing device 1606 may allocate the number of physical buckets as a function of a maximum number of buckets based on a factor of two to an integer value corresponding to the applicable hash value width/size (e.g., $2^1$, $2^{16}$, etc.).

In block 1808, the network computing device 1606 configures a bucket threshold value as a function of a size of the hash function of the hash table. As described previously, the bucket threshold value is used to perform a bucket/entry lookup operation (e.g., for a hash result greater than the bucket threshold value, ignore the top bit of the hash value). In block 1810, the network computing device 1606 generates a number of virtual bucket addresses as a function of the threshold value. In block 1812, the network computing device 1606 applies a virtual-to-physical mapping scheme to map the virtual bucket addresses to corresponding physical bucket addresses.

Figure 20:
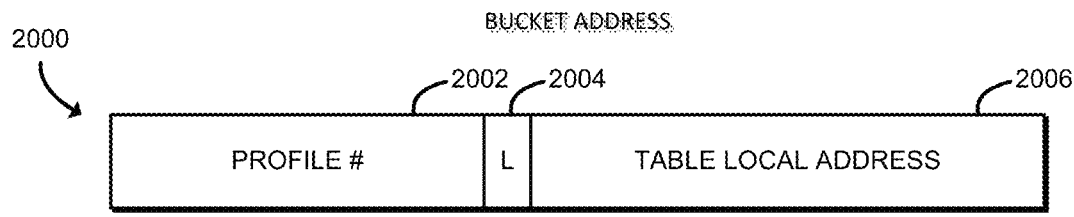
FIG. 20 is a simplified block diagram of the segments of a bucket address.

An illustrative virtual bucket address 2000 is shown in FIG. 20 which includes a profile number 2002 and a table local address 2004. In an illustrative example, the virtual bucket address 2000 may be comprised of 28 bits, of which the profile number 2002 may be allocated 11 bits and the table local address 2004 may be allocated the remaining 17 bits. Accordingly, the hash table corresponding to the illustrative example can hold a maximum total number of 128 k (i.e., $2^{17}$) bucket addresses.

Figure 21:
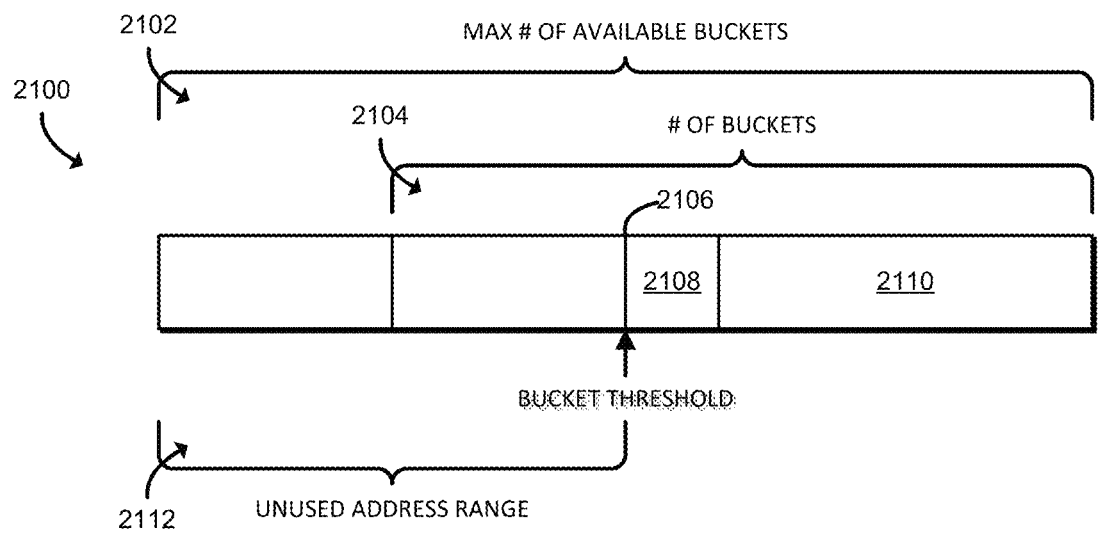
FIG. 21 is a simplified block diagram of the segments of a block of hash table bucket addresses.

For example, in FIG. 21, an illustrative hash table 2100 is shown which can hold a maximum total number of bucket addresses (e.g., 128 k or $2^{17}$ using the previous illustrative example). As illustratively shown, only a portion of the maximum total number of bucket addresses has been allocated. The hash table 2100 shows a maximum number of available buckets 2102 relative to the size of a table local address of the bucket addresses, a number of buckets 2104 relative to the hash size (i.e., $2^{HASH\_SIZE}$ buckets), and a bucket threshold value 2106. The number of buckets 2104 includes a number of mapped buckets 2110 (i.e., $2^{(HASH\_SIZE-1)}$ buckets) and a number of unmapped buckets 2108 (i.e., the bucket threshold value 2106 less $2^{(HASH\_SIZE-1)}$ buckets). The remaining portion of the maximum number of available buckets 2102 corresponds to an unused address range 2112 (i.e., the remainder of the maximum total number of addresses less the number of buckets 2104 based on the bucket threshold value 2106).

Figure 19:
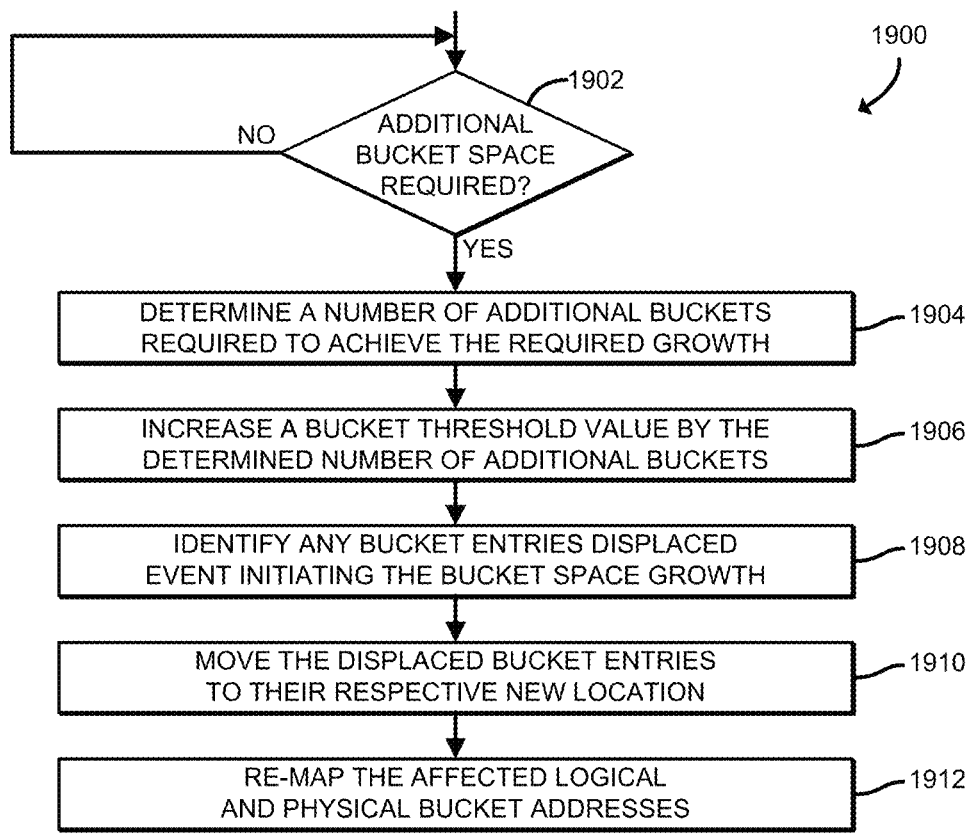
FIG. 19 is a simplified flow diagram of at least one embodiment of a method for managing exact match hash table growth during a hash table growth phase that may be executed by the network computing device of FIGS. 16 and 17.

Referring now to FIG. 19, a method 1900 for managing exact match hash table growth during a hash table growth phase is shown which may be executed by a network computing device (e.g., the network computing device 1606 of FIG. 16), or more particularly by a hash engine of a NIC of the network computing device 1606 (e.g., the hash engine 1710 of the NIC 1620 of FIG. 17). The method 1900 begins with block 1902, in which the network computing device 1606 determines whether additional bucket space is required, such as may be triggered upon receipt of a hash table growth request prompted by a hash configuration change (e.g., the number of bits of the hash value used to pick the corresponding bucket has been increased). If so, the method 1900 advances to block 1904, in which the network computing device 1606 determines a number of additional buckets required to achieve the required growth.

In block 1906, the network computing device 1606 increases a bucket threshold value by the number of additional required buckets. In block 1908, the network computing device 1606 identifies any bucket entries which may have been displaced by the addition of the additional required buckets resulting from the increase in block 1906. For example, if the additional bucket space is required due to the hash having grown in size, a certain number of bucket entries may no longer correspond to their previous location in the hash table. In block 1910, the network computing device 1606 moves the displaced bucket entries to their respective new location (e.g., as a function of the updated hash). It should be appreciated that, unlike present techniques, the network computing device 1606 only has to move a number of buckets worth of entries relative to the growth of the number of buckets. As such, the time cost of moving entries across many instances of hash table growth can be amortized.

In block 1912, the network computing device 1606 re-maps the affected logical and physical bucket addresses using the linear hashing technique described herein. For example, a hash table capable of holding $2^{HASH\_SIZE}$ buckets worth of entries may receive a growth request indicating that the hash table is to be increased by "N" buckets, wherein "N" is an integer value greater than zero. Accordingly, the bucket threshold value can be increased by "N." As such, only "N" buckets worth of entries may have to be moved to a new location, thereby amortizing the time cost of moving entries across many instances of hash table growth.

Figure 22:
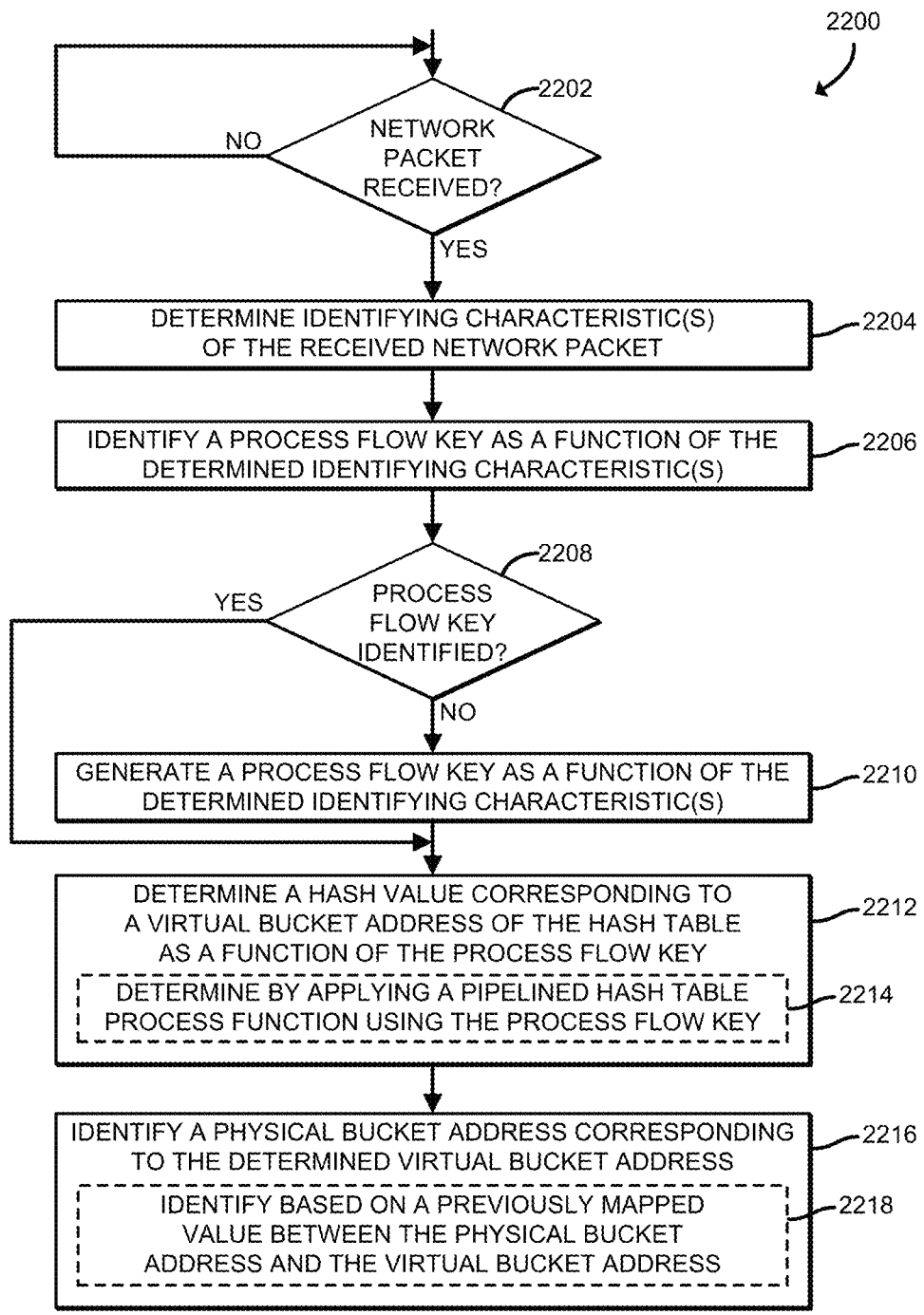
FIG. 22 is a simplified flow diagram of at least one embodiment of a method for performing a lookup operation on an exact match hash table configured to manage growth that may be executed by the network computing device of FIGS. 16 and 17.

Referring now to FIG. 22, a method 2200 for performing a lookup operation on an exact match hash table configured to manage growth is shown which may be executed by a network computing device (e.g., the network computing device 1606 of FIG. 16), or more particularly by a hash engine of a NIC of the network computing device 1606 (e.g., the hash engine 1710 of the NIC 1620 of FIG. 17). The method 2200 begins with block 2202, in which the network computing device 1606 determines whether a network packet has been received. If so, the method 2200 advances to block 2204, in which the network computing device 1606 determines one or more identifying characteristics of the network packet. As described previously, the identifying characteristics may include any data/content of the network packet usable to identify the network packet and generate a key therefrom, such as a source IP address, a destination IP address, a source port number, a destination port number, an application associated with the network packet, a workflow type of the network packet, a protocol associated with the network packet, and/or other data associated with the network packet.

In block 2206, the network computing device 1606 identifies a process flow key as a function of the determined identifying characteristic(s). In block 2208, the network computing device 1606 determines whether the process flow key was identified in block 2206. If so, the method 2200 jumps to block 2212, which is described below; otherwise, the method 2200 advances to block 2210, in which the network computing device 1606 generates a process flow key as a function of the determined identifying characteristics(s) of the network packet. In block 2212, the network computing device 1606 determines a hash value corresponding to a virtual bucket address of the hash table as a function of the process flow key. For example, in block 2214, the network computing device 1606 may determine the virtual bucket address by applying a pipelined hash table process function using the process flow key. In block 2216, the network computing device 1606 identifies a physical bucket address corresponding to the virtual bucket address. To do so, in block 2218, the network computing device 1606 identifies the physical bucket address based on a previously mapped value mapping the virtual bucket address to the corresponding physical bucket address.

EXAMPLES

Illustrative examples of the technologies disclosed herein are provided below. An embodiment of the technologies may include any one or more, and any combination of, the examples described below.

Example 1 includes a network computing device for managing exact match hash table growth, the network computing device comprising a compute engine; and a network interface controller (NIC) to allocate a plurality of physical bucket addresses in non-contiguous chunks of memory of the compute engine; configure a bucket threshold value as a function of a hash size of the hash table; generate a plurality of virtual bucket addresses as a function of the bucket threshold value; and map each generated virtual bucket address to an allocated physical bucket address.

Example 2 includes the subject matter of Example 1, and wherein the NIC is further to receive a table growth request; determine, in response to having received the table growth request, a number of additional buckets requested by the received table growth request; and increase the bucket threshold value as a function of the number of additional buckets requested by the received table growth request.

Example 3 includes the subject matter of any of Examples 1 and 2, and wherein the NIC is further to identify any bucket entries displaced by the additional buckets; move the displaced bucket entries as a function of an updated hash associated with the received table growth request; and re-map the displaced virtual bucket addresses to a corresponding physical bucket address.

Example 4 includes the subject matter of any of Examples 1-3, and wherein to determine the number of additional buckets requested by the received table growth request includes to determine a difference between a present number of bits of a hash value and an updated number of bits of the hash value.

Example 5 includes the subject matter of any of Examples 1-4, and wherein the NIC is further to receive a network packet; determine one or more identifiers of the network packet; generate a process flow key as a function of the determined one or more identifiers of the network packet; perform a lookup operation as a function of a pipelined hash table process function and the process flow key to return a virtual bucket address; and determine a physical bucket address corresponding to the virtual bucket address.

Example 6 includes the subject matter of any of Examples 1-5, and wherein the one or more identifiers include at least one of a source Internet Protocol (IP) address, a destination IP address, a source port number, a destination port number, an application associated with the received network packet, a workflow type associated with the received network packet, and a protocol associated with the received network packet.

Example 7 includes the subject matter of any of Examples 1-6, and wherein to perform the lookup operation comprises to compute a hash value, compare the hash value to the bucket threshold value, and ignore a top bit of the hash value in response to a determination as a result of the comparison that the hash value is greater than the bucket threshold value.

Example 8 includes a method for managing exact match hash table growth, the method comprising allocating, by a network interface controller (NIC) of a network computing device, a plurality of physical bucket addresses in non-contiguous chunks of memory of the compute engine; configuring, by the NIC, a bucket threshold value as a function of a hash size of the hash table; generating, by the NIC, a plurality of virtual bucket addresses as a function of the bucket threshold value; and mapping, by the NIC, each generated virtual bucket address to an allocated physical bucket address.

Example 9 includes the subject matter of Example 8, and further including receiving, by the NIC, a table growth request; determining, by the NIC and in response to having received the table growth request, a number of additional buckets requested by the received table growth request; and increasing, by the NIC, the bucket threshold value as a function of the number of additional buckets requested by the received table growth request.

Example 10 includes the subject matter of any of Examples 8 and 9, and further including identifying, by the NIC, any bucket entries displaced by the additional buckets; moving, by the NIC, the displaced bucket entries as a function of an updated hash associated with the received table growth request; and re-mapping, by the NIC, the displaced virtual bucket addresses to a corresponding physical bucket address.

Example 11 includes the subject matter of any of Examples 8-10, and wherein determining the number of additional buckets requested by the received table growth request includes determining a difference between a present number of bits of the hash value and an updated number of bits of the hash value.

Example 12 includes the subject matter of any of Examples 8-11, and further including receiving, by the NIC, a network packet; determining, by the NIC, one or more identifiers of the network packet; generating, by the NIC, a process flow key as a function of the determined one or more identifiers of the network packet; performing, by the NIC, a lookup operation as a function of a pipelined hash table process function and the process flow key to return a virtual bucket address; and determining, by the NIC, a physical bucket address corresponding to the virtual bucket address.

Example 13 includes the subject matter of any of Examples 8-12, and wherein determining the one or more identifiers comprises determining at least one of a source Internet Protocol (IP) address, a destination IP address, a source port number, a destination port number, an application associated with the received network packet, a workflow type associated with the received network packet, and a protocol associated with the received network packet.

Example 14 includes the subject matter of any of Examples 8-13, and wherein performing the lookup operation comprises (i) computing a hash value, (ii) comparing the hash value to the bucket threshold value, and (iii) ignoring a top bit of the hash value in response to a determination as a result of the comparison that the hash value is greater than the bucket threshold value.

Example 15 includes one or more machine-readable storage media comprising a plurality of instructions stored thereon that, in response to being executed, cause a network computing device to perform the method of any of Examples 8-14.

Example 16 includes a network computing device comprising one or more processors; one or more memory devices having stored therein a plurality of instructions that, when executed by the one or more processors, cause the network computing device to perform the method of any of Examples 8-14.

Example 17 includes a network computing device for managing exact match hash table growth, the network computing device comprising hash engine circuitry to allocate a plurality of physical bucket addresses in non-contiguous chunks of memory of the compute engine; configure a bucket threshold value as a function of a hash size of the hash table; generate a plurality of virtual bucket addresses as a function of the bucket threshold value; and map each generated virtual bucket address to an allocated physical bucket address.

Example 18 includes the subject matter of Example 17, and wherein the hash engine circuitry is further to receive a table growth request; determine, in response to having received the table growth request, a number of additional buckets requested by the received table growth request; and increase the bucket threshold value as a function of the number of additional buckets requested by the received table growth request.

Example 19 includes the subject matter of any of Examples 17 and 18, and wherein the hash engine circuitry is further to identify any bucket entries displaced by the additional buckets; move the displaced bucket entries as a function of an updated hash associated with the received table growth request; and re-map the displaced virtual bucket addresses to a corresponding physical bucket address.

Example 20 includes the subject matter of any of Examples 17-19, and wherein to determine the number of additional buckets requested by the received table growth request includes to determine a difference between a present number of bits of a hash value and an updated number of bits of the hash value.

Example 21 includes the subject matter of any of Examples 17-20, and wherein the hash engine circuitry is further to receive a network packet; determine one or more identifiers of the network packet; generate a process flow key as a function of the determined one or more identifiers of the network packet; perform a lookup operation as a function of a pipelined hash table process function and the process flow key to return a virtual bucket address; and determine a physical bucket address corresponding to the virtual bucket address.

Example 22 includes the subject matter of any of Examples 17-21, and wherein the one or more identifiers include at least one of a source Internet Protocol (IP) address, a destination IP address, a source port number, a destination port number, an application associated with the received network packet, a workflow type associated with the received network packet, and a protocol associated with the received network packet.

Example 23 includes the subject matter of any of Examples 17-22, and wherein to perform the lookup operation comprises to compute a hash value, compare the hash value to the bucket threshold value, and ignore a top bit of the hash value in response to a determination as a result of the comparison that the hash value is greater than the bucket threshold value.

Example 24 includes a network computing device for managing exact match hash table growth, the network computing device comprising circuitry for allocating, by a network interface controller (NIC) of a network computing device, a plurality of physical bucket addresses in non-contiguous chunks of memory of the compute engine; means for configuring, by the NIC, a bucket threshold value as a function of a hash size of the hash table; means for generating, by the NIC, a plurality of virtual bucket addresses as a function of the bucket threshold value; and means for mapping, by the NIC, each generated virtual bucket address to an allocated physical bucket address.

Example 25 includes the subject matter of Example 24, and further including circuitry for receiving, by the NIC, a table growth request; means for determining, by the NIC and in response to having received the table growth request, a number of additional buckets requested by the received table growth request; and means for increasing, by the NIC, the bucket threshold value as a function of the number of additional buckets requested by the received table growth request.

Example 26 includes the subject matter of any of Examples 24 and 25, and further including means for identifying, by the NIC, any bucket entries displaced by the additional buckets; means for moving, by the NIC, the displaced bucket entries as a function of an updated hash associated with the received table growth request; and means for re-mapping, by the NIC, the displaced virtual bucket addresses to a corresponding physical bucket address.

Example 27 includes the subject matter of any of Examples 24-26, and wherein the means for determining the number of additional buckets requested by the received table growth request includes means for determining a difference between a present number of bits of the hash value and an updated number of bits of the hash value.

Example 28 includes the subject matter of any of Examples 24-27, and further including circuitry for receiving, by the NIC, a network packet; circuitry for determining, by the NIC, one or more identifiers of the network packet; circuitry for generating, by the NIC, a process flow key as a function of the determined one or more identifiers of the network packet; means for performing, by the NIC, a lookup operation as a function of a pipelined hash table process function and the process flow key to return a virtual bucket address; and means for determining, by the NIC, a physical bucket address corresponding to the virtual bucket address.

Example 29 includes the subject matter of any of Examples 24-28, and wherein the determining the one or more identifiers comprises determining at least one of a source Internet Protocol (IP) address, a destination IP address, a source port number, a destination port number, an application associated with the received network packet, a workflow type associated with the received network packet, and a protocol associated with the received network packet.

Example 30 includes the subject matter of any of Examples 24-29, and wherein the means for performing the lookup operation comprises means for computing a hash value, comparing the hash value to the bucket threshold value, and ignoring a top bit of the hash value in response to a determination as a result of the comparison that the hash value is greater than the bucket threshold value.

The invention claimed is:

1. A network computing device for managing exact match hash table growth, the network computing device comprising:
   a compute engine; and
   a network interface controller (NIC) to:
      allocate a plurality of physical bucket addresses in non-contiguous chunks of memory of the compute engine;
      configure a bucket threshold value as a function of a hash size of a hash table;

generate a plurality of virtual bucket addresses as a function of the bucket threshold value;

map each generated virtual bucket address to an allocated physical bucket address;

receive a table growth request;

determine, in response to having received the table growth request, a number of additional buckets requested by the received table growth request, wherein to determine the number of additional buckets requested by the received table growth request includes to determine a difference between a present number of bits of a hash value and an updated number of bits of the hash value; and increase the bucket threshold value as a function of the number of additional buckets requested by the received table growth request.

2. The network computing device of claim 1, wherein the NIC is further to:

identify any bucket entries displaced by number of additional buckets;

move the displaced bucket entries as a function of an updated hash associated with the received table growth request; and re-map displaced virtual bucket addresses to a corresponding physical bucket address.

3. The network computing device of claim 1, wherein the NIC is further to:

receive a network packet;

determine one or more identifiers of the network packet;

generate a process flow key as a function of the determined one or more identifiers of the network packet;

perform a lookup operation as a function of a pipelined hash table process function and the process flow key to return a virtual bucket address; and determine a physical bucket address corresponding to the virtual bucket address.

4. The network computing device of claim 3, wherein the one or more identifiers include at least one of a source Internet Protocol (IP) address, a destination IP address, a source port number, a destination port number, an application associated with the received network packet, a workflow type associated with the received network packet, and a protocol associated with the received network packet.

5. The network computing device of claim 3, wherein to perform the lookup operation comprises to compute a hash value, compare the hash value to the bucket threshold value, and ignore a top bit of the hash value in response to a determination as a result of the comparison that the hash value is greater than the bucket threshold value.

6. One or more non-transitory machine-readable storage media comprising a plurality of instructions stored thereon that, in response to being executed, cause a network computing device to:

allocate, by a network interface controller (NIC) of the network computing device, a plurality of physical bucket addresses in non-contiguous chunks of memory of a compute engine of the network computing device;

configure, by the NIC, a bucket threshold value as a function of a hash size of a hash table;

generate, by the NIC, a plurality of virtual bucket addresses as a function of the bucket threshold value;

map, by the NIC, each generated virtual bucket address to an allocated physical bucket address;

receive, by the NIC, a table growth request;

determine, by the NIC and in response to having received the table growth request, a number of additional buckets requested by the received table growth request, wherein to determine the number of additional buckets requested by the received table growth request includes to determine a difference between a present number of bits of a hash value and an updated number of bits of the hash value; and increase, by the NIC, the bucket threshold value as a function of the number of additional buckets requested by the received table growth request.

7. The one or more non-transitory machine-readable storage media of claim 6, wherein the plurality of instructions further cause the network computing device to:

identify, by the NIC, any bucket entries displaced by number of additional buckets;

move, by the NIC, the displaced bucket entries as a function of an updated hash associated with the received table growth request; and re-map, by the NIC, displaced virtual bucket addresses to a corresponding physical bucket address.

8. The one or more non-transitory machine-readable storage media of claim 6, wherein the plurality of instructions further cause the network computing device to:

receive, by the NIC, a network packet;

determine, by the NIC, one or more identifiers of the network packet;

generate, by the NIC, a process flow key as a function of the determined one or more identifiers of the network packet;

perform, by the NIC, a lookup operation as a function of a pipelined hash table process function and the process flow key to return a virtual bucket address; and determine, by the NIC, a physical bucket address corresponding to the virtual bucket address.

9. The one or more non-transitory machine-readable storage media of claim 8, wherein the one or more identifiers include at least one of a source Internet Protocol (IP) address, a destination IP address, a source port number, a destination port number, an application associated with the received network packet, a workflow type associated with the received network packet, and a protocol associated with the received network packet.

10. The one or more non-transitory machine-readable storage media of claim 8, wherein to perform the lookup operation comprises to compute a hash value, compare the hash value to the bucket threshold value, and ignore a top bit of the hash value in response to a determination as a result of the comparison that the hash value is greater than the bucket threshold value.

11. A network computing device for managing exact match hash table growth, the network computing device comprising:

circuitry for allocating, by a network interface controller (NIC) of a network computing device, a plurality of physical bucket addresses in non-contiguous chunks of memory of the network computing device;

means for configuring, by the NIC, a bucket threshold value as a function of a hash size of a hash table;

means for generating, by the NIC, a plurality of virtual bucket addresses as a function of the bucket threshold value;

means for mapping, by the NIC, each generated virtual bucket address to an allocated physical bucket address;

circuitry for receiving, by the NIC, a table growth request;

means for determining, by the NIC and in response to having received the table growth request, a number of additional buckets requested by the received table growth request, wherein the means for determining the number of additional buckets requested by the received table growth request includes means for determining a difference between a present number of bits of the hash value and an updated number of bits of a hash value; and means for increasing, by the NIC, the bucket threshold value as a function of the number of additional buckets requested by the received table growth request.

12. The network computing device of claim 11, further comprising:

means for identifying, by the NIC, any bucket entries displaced by number of additional buckets;

means for moving, by the NIC, the displaced bucket entries as a function of an updated hash associated with the received table growth request; and means for re-mapping, by the NIC, displaced virtual bucket addresses to a corresponding physical bucket address.

13. The network computing device of claim 11, further comprising:

circuitry for receiving, by the NIC, a network packet;

circuitry for determining, by the NIC, one or more identifiers of the network packet;

circuitry for generating, by the NIC, a process flow key as a function of the determined one or more identifiers of the network packet;

means for performing, by the NIC, a lookup operation as a function of a pipelined hash table process function and the process flow key to return a virtual bucket address; and means for determining, by the NIC, a physical bucket address corresponding to the virtual bucket address.

14. The network computing device of claim 13, wherein the determining the one or more identifiers comprises determining at least one of a source Internet Protocol (IP) address, a destination IP address, a source port number, a destination port number, an application associated with the received network packet, a workflow type associated with the received network packet, and a protocol associated with the received network packet.

15. The network computing device of claim 13, wherein the means for performing the lookup operation comprises means for computing a hash value, comparing the hash value to the bucket threshold value, and ignoring a top bit of the hash value in response to a determination as a result of the comparison that the hash value is greater than the bucket threshold value.

16. A method for managing exact match hash table growth, the method comprising:

allocating, by a network interface controller (NIC) of a network computing device, a plurality of physical bucket addresses in non-contiguous chunks of memory of the network computing device;

configuring, by the NIC, a bucket threshold value as a function of a hash size of a hash table;

generating, by the NIC, a plurality of virtual bucket addresses as a function of the bucket threshold value;

mapping, by the NIC, each generated virtual bucket address to an allocated physical bucket address;

receiving, by the NIC, a table growth request;

determining, by the NIC and in response to having received the table growth request, a number of additional buckets requested by the received table growth request, wherein determining the number of additional buckets requested by the received table growth request includes determining a difference between a present number of bits of a hash value and an updated number of bits of the hash value; and increasing, by the NIC, the bucket threshold value as a function of the number of additional buckets requested by the received table growth request.

17. The method of claim 16, further comprising:

identifying, by the NIC, any bucket entries displaced by number of additional buckets;

moving, by the NIC, the displaced bucket entries as a function of an updated hash associated with the received table growth request; and re-mapping, by the NIC, displaced virtual bucket addresses to a corresponding physical bucket address.

18. The method of claim 16, further comprising:

receiving, by the NIC, a network packet;

determining, by the NIC, one or more identifiers of the network packet;

generating, by the NIC, a process flow key as a function of the determined one or more identifiers of the network packet;

performing, by the NIC, a lookup operation as a function of a pipelined hash table process function and the process flow key to return a virtual bucket address; and determining, by the NIC, a physical bucket address corresponding to the virtual bucket address.

* * * * *